US005722468A

United States Patent [19]

Kido

[11] Patent Number: 5,722,468

[45] Date of Patent: Mar. 3, 1998

[54] EVAPORATIVE-FUEL EMISSION PREVENTING APPARATUS

[75] Inventor: Katsuyuki Kido, Seto, Japan

[73] Assignee: Toyota Jidosha Kabushiki Kaisha, Toyota, Japan

[21] Appl. No.: 614,691

[22] Filed: Mar. 13, 1996

[30] Foreign Application Priority Data

Apr. 5, 1995 [JP] Japan .................................... 7-080060
Apr. 7, 1995 [JP] Japan .................................... 7-081629
Apr. 19, 1995 [JP] Japan .................................... 7-093465

[51] Int. Cl.$^6$ .................................................. B65B 1/04

[52] U.S. Cl. ............................ 141/59; 141/301; 141/307; 137/587; 123/519

[58] Field of Search ................................. 141/44–46, 59, 141/290, 285, 301–303, 307, 308, 309, 198; 137/43, 588, 587; 123/519

[56] References Cited

U.S. PATENT DOCUMENTS 4,135,562 1/1979 Martineau et al. .
4,659,346 4/1987 Uranishi et al. .
4,714,172 12/1987 Morris .
4,869,283 9/1989 Oeffling et al. .
4,872,439 10/1989 Sonoda et al. .
5,099,880 3/1992 Szlaga et al. ........................... 123/519
5,318,069 6/1994 Harris ...................................... 123/519
5,462,100 10/1995 Covert et al. .
5,524,662 6/1996 Benjey et al. ........................... 137/43

FOREIGN PATENT DOCUMENTS 55-015376 5/1980 Japan .
60-122218 8/1985 Japan .
62-194936 8/1987 Japan .
2-012927 1/1990 Japan .
3-042426 4/1991 Japan .
5-001547 1/1993 Japan .

*Primary Examiner*—Henry J. Recla
*Assistant Examiner*—Steven O. Douglas
*Attorney, Agent, or Firm*—Cushman, Darby & Cushman IP Group of Pillsbury, Madison & Sutro LLP

[57] ABSTRACT

In an evaporative-fuel emission preventing apparatus, a differential pressure regulating valve provided in the course of a passageway for connecting a fuel tank and a canister includes a valve section and a case section including a conduit for connecting the differential pressure regulating valve and the canister. The valve section has a communicating hole for connecting the low and high pressure sections of the differential pressure regulating valve. Liquid fuel flowing into the low pressure section is returned to the fuel tank via the communicating hole. When fueling, the quantity of air in the communicating hole can be controlled by a convex portion. Further, the conduit has a communicating hole for connecting the conduit and the fuel tank. When an interlocking valve formed in the valve section moves with an opening operation of the valve section and is separated from the communicating hole, liquid fuel within the conduit can be returned to the fuel tank via the communicating hole. Further, a gas-liquid separating member is formed integrally with the valve section. Even when the differential pressure regulating valve inadvertently opens due to running vibration of the vehicle or the like, an opening portion of the differential pressure regulating valve is closed by the gas-liquid separating member, which makes it possible to prevent the liquid fuel from being introduced into the canister.

5 Claims, 16 Drawing Sheets

EVAPORATIVE-FUEL EMISSION PREVENTING APPARATUS

BACKGROUND OF THE INVENTION

1. Field of the Invention

The present invention relates to an evaporative-fuel emission preventing apparatus for an automobile fuel tank, and particularly to an evaporative-fuel emission preventing apparatus in which evaporative fuel within a fuel tank is processed by a canister upon fueling.

2. Description of the Related Art

There has been proposed a system in which evaporative fuel generated within a fuel tank is adsorbed by a canister so as not to be discharged into the atmosphere (U.S. Pat. No. 4,714,172).

According to this system, as shown in FIG. 16, an automobile fuel tank 620 and a canister 622 are connected to each other via a differential pressure regulating valve 650. The differential pressure regulating valve 650 is divided by a diaphragm 664 into a low pressure section 652 and a high pressure section 654. The low pressure section 652 of the differential pressure regulating valve 650 is connected to the vicinity of a fueling port of an inlet pipe 626 via a conduit 624, and the high pressure section 654 of the differential pressure regulating valve 650 communicates with the fuel tank 620.

When a fuel cap 628 is closed, the pressures in the low pressure section 652 and the high pressure section 654 of the differential pressure regulating valve 650 are the same. A moving portion 656 is urged against a sealing seat 658 toward the canister 622 by elastic force of a spring 670, so that the differential pressure regulating valve 650 is closed so as to shut off a passageway for connecting the fuel tank 620 and the canister 622.

When the fuel cap 628 is open for fueling or the like, the low pressure section 652 is changed from a high pressure condition (i.e., tank internal pressure) to a low pressure condition (i.e., atmospheric pressure), and thereafter, the pressure of the high pressure section 654 becomes low. Thus, the differential pressure regulating valve 650 is opened on the basis of the difference in pressure between the low pressure section 652 and the higher pressure section 654 at the beginning of the period of time when the fuel cap 628 is open.

At the time of fueling, the low pressure section 652 is in a low pressure (i.e., atmospheric pressure) condition because it is connected to the vicinity of the fueling port of the inlet pipe, and the pressure of the high pressure section 654 becomes high (i.e., positive pressure) due to an increase of the fuel liquid surface which is caused by injection of fuel. The differential pressure regulating valve 650 is opened on the basis of the difference in pressure between the low pressure section 652 and the higher pressure section 654 so as to open the passageway for connecting the fuel tank 620 and the canister 622.

Then, evaporative fuel generated Within the fuel tank 620 is introduced into the canister 622 and is adsorbed by activated carbon or the like of the canister 622. As a result, emission of the evaporative fuel into the atmosphere is prevented.

However, when the differential pressure regulating valve is used as described in the above-described system, liquid fuel flows from the vicinity of the fueling port of the inlet pipe into the low pressure section due to movement of the fuel during turning of a motor car or the like, and is stored therein. Alternatively, evaporative fuel within the passageway for connecting the low pressure section and the inlet pipe is cooled down after an engine has stopped, and is then liquefied. The liquid fuel flows into and is stored in the low pressure section. As a result, the liquid fuel stored in the low pressure section causes an undesirable effect in that, even if the differential pressure regulating valve is subjected to the difference in pressure between the low pressure section and the high pressure section during fueling, the differential pressure regulating valve is difficult to open.

In view of the aforementioned, it is a first object of the present invention to promptly return the liquid fuel introduced into the low pressure section of the differential pressure regulating valve to the fuel tank by a communicating member which allows communication between the low pressure section and the fuel tank, and further to effect an opening operation of the differential pressure regulating valve at the time of fueling without being affected by the communicating member.

Further, with the above-described system, when the differential pressure regulating valve opens inadvertently due to running vibration of a motor car, as an interior of the passageway between the differential pressure regulating valve and the canister is subjected to intake of air by an engine intake manifold (not shown) together with the canister and is thereby at negative pressure, fuel within the fuel tank flows out in the passageway across the sealing seat of the differential pressure regulating valve. Further, even though the interior of the passageway is at negative pressure with the differential pressure regulating valve closed, there is no flow of gas within the passageway. For this reason, the above-described fuel is not introduced into the canister and remains within the passageway. When the above-described fuel is evaporative, it is liquefied within the passageway. Further, when it is liquid fuel which is introduced into the high pressure section of the differential pressure regulating valve by a rapid turning motion of the motor car, the liquid fuel remains within the passageway.

When, during fueling, the differential pressure regulating valve opens and the evaporative fuel is introduced into the canister, the liquid fuel stored within the passageway is also introduced into the canister. For this reason, it becomes necessary to increase an amount of activated carbon of the canister to process the liquid fuel within the passageway, thereby resulting in an increase in size of the canister.

Accordingly, it is a second object of the present invention to reduce the size of the canister by selectively opening a passageway for connecting an opening/closing valve such as the differential pressure opening valve and the canister toward an interior of the fuel tank and by returning the liquid fuel stored within the passageway to the fuel tank.

As another example, there has been proposed an internal pressure regulating apparatus of a fuel tank for a vehicle, which prevents liquid fuel from flowing into a canister for adsorbing evaporative fuel generated within the fuel tank and which regulates the pressure within the fuel tank. In this apparatus, a cutoff valve of the liquid fuel, a gas-liquid separator, and a two-way valve are integrally formed into one unit, so that a mounting of the apparatus to the vehicle can be simplified and a cost reduction of the apparatus can be achieved (see Japanese Utility Model Application Laid-Open No. 5-1547).

According to the apparatus disclosed therein, evaporative fuel and liquid fuel within the fuel tank are separated from each other by the gas-liquid separator, and the evaporative fuel within the fuel tank is introduced into the canister by opening the two-way valve to regulate the internal pressure of the fuel tank.

However, with the above-described apparatus, the liquid fuel flowing into the internal pressure regulating apparatus due to running vibration of the vehicle and a rapid turning motion thereof cannot be completely separated from the evaporative fuel by the gas-liquid separator and flows in the vicinities of the two-way valve. At this time, when the two-way valve is opened, means for separating gas and liquid is not located in the vicinities of an opening portion of the two-way valve and the liquid fuel flows into the canister through the opening portion of the two-way valve. For this reason, it is necessary to increase an amount of activated carbon of the canister to process the liquid fuel, thereby resulting in an increase in size of the canister.

Accordingly, it is a third object of the present invention to prevent the liquid fuel from flowing into the canister by relatively moving a member for separating gas and liquid, for example, a gas-liquid separator, with respect to the fuel tank.

SUMMARY OF THE INVENTION

In order to achieve the above-described first object of the present invention, in accordance with a first aspect of the present invention, there is provided an evaporative-fuel emission preventing apparatus comprising: a fuel tank for a vehicle; a canister for processing evaporative fuel generated within the fuel tank; a passageway for connecting the fuel tank and the canister; a differential pressure regulating valve which is provided in the course of the passageway so as to open and shut off the passageway by an opening and closing operation of the differential pressure regulating valve, a low pressure section of the differential pressure regulating valve being connected to a vicinity of a fueling port of the fuel tank and a high pressure section of the differential pressure regulating valve being connected to the fuel tank; and a communicating member provided to allow communication between the low pressure section of the differential pressure regulating valve and the fuel tank and return liquid fuel introduced into the low pressure section of the differential pressure regulating valve to the fuel tank.

The liquid fuel introduced into the low pressure section of the differential pressure regulating valve is returned to the fuel tank by the communicating member which allows communication between the low pressure section and the fuel tank.

Further, there can be provided the passing gas quantity-limiting member which, when fueling, limits the quantity of passing gas of the evaporative fuel introduced into the low pressure section of the differential pressure regulating valve through the communicating member.

When the passing gas quantity-limiting member is provided, the quantity of passing gas of the evaporative fuel introduced into the low pressure section through the communicating member is limited when fueling. For this reason, the evaporative fuel is prevented from being discharged from the low pressure section into the atmosphere via the fueling port of the fuel tank and reduction in pressure within the fuel tank can be alleviated so as to maintain the opening of the differential pressure regulating valve. Thus, the opening operation of the differential pressure regulating valve when fueling is effected without being affected by the communicating member.

In order to achieve the above-described second object of the present invention, in accordance with a second aspect of the present invention, there is provided an evaporative-fuel emission preventing apparatus comprising: a fuel tank for a vehicle; a canister for processing evaporative fuel generated within the fuel tank: an opening/closing valve provided between the fuel tank and the canister; a first passageway for connecting the fuel tank and the opening/closing valve; a second passageway for connecting the opening/closing valve and the canister; a communicating portion which allows communication between the second passageway and the fuel tank; and a communicating/cutoff valve for selectively opening and shutting off the communicating portion.

The communicating portion which allows communication between the second passageway for connecting the opening/closing valve and the canister, and the fuel tank is selectively opened and shut off by the communicating/cutoff valve. When the communicating portion is open, the second passageway and the fuel tank communicate with each other and the liquid fuel stored in the second passageway is returned to the fuel tank through the communicating portion.

The above-described communicating/cutoff valve can serve as the interlocking valve which moves synchronous with the opening and closing operation of the opening/closing valve.

Further, the interlocking valve can be equipped with the passing gas quantity-limiting member for controlling the quantity of passing gas in the communicating portion in accordance with the opening of the opening/closing valve.

When the interlocking valve which is the communicating/cutoff valve is provided with the passing gas quantity-limiting member, the quantity of passing gas of the evaporative fuel introduced from the fuel tank into the canister through the communicating portion in accordance with the opening of the opening/closing valve can be controlled and the liquid fuel stored in the second passageway is prevented from being introduced into the canister.

In order to achieve the above-described third object of the present invention, in accordance with a third aspect of the present invention, there is provided an evaporative-fuel emission preventing apparatus comprising: a fuel tank for a vehicle; a canister for adsorbing evaporative fuel generated within the fuel tank; a passageway for connecting the fuel tank and the canister; an opening/closing valve which is provided in the course of the passageway to open and shut off the passageway; and a gas-liquid separating member which moves synchronous with the opening operation of the opening/closing valve to close the opening portion of the opening/closing valve.

The gas-liquid separating member moves synchronous with the opening operation of the opening/closing valve to close the opening portion of the opening/closing valve.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
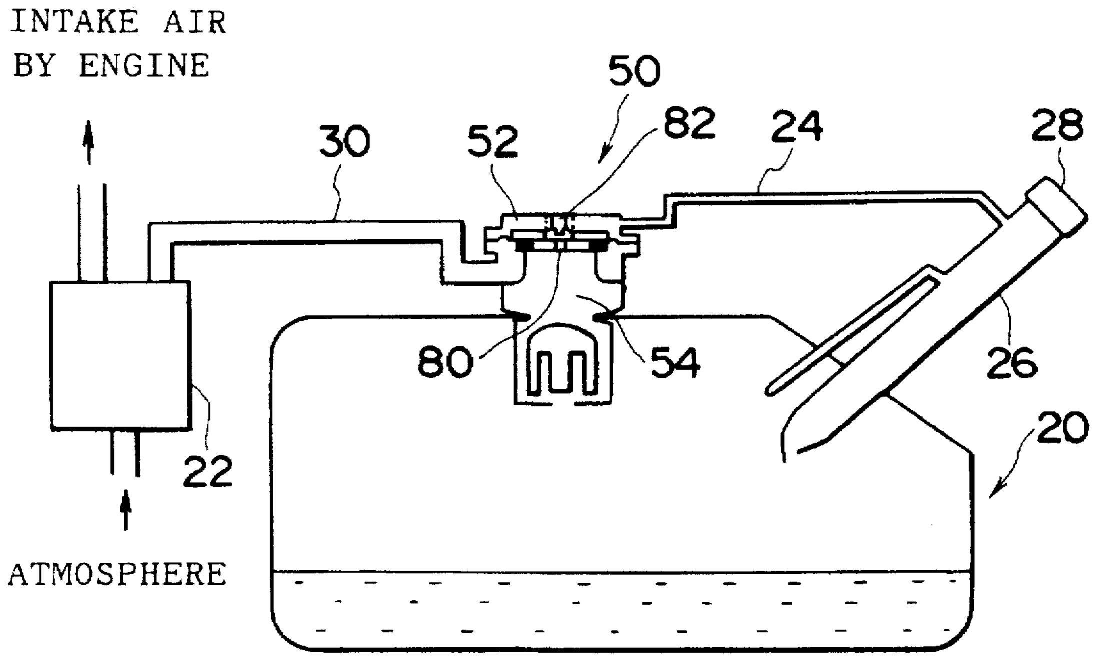
FIG. 1 is an overall diagram of an evaporative-fuel emission preventing apparatus of an automobile fuel tank according to a first embodiment of the present invention.
Figure 2B:
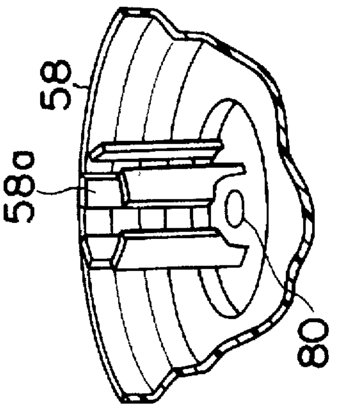
FIG. 2B is a perspective view showing partial details of the differential pressure regulating valve.
Figure 2A:
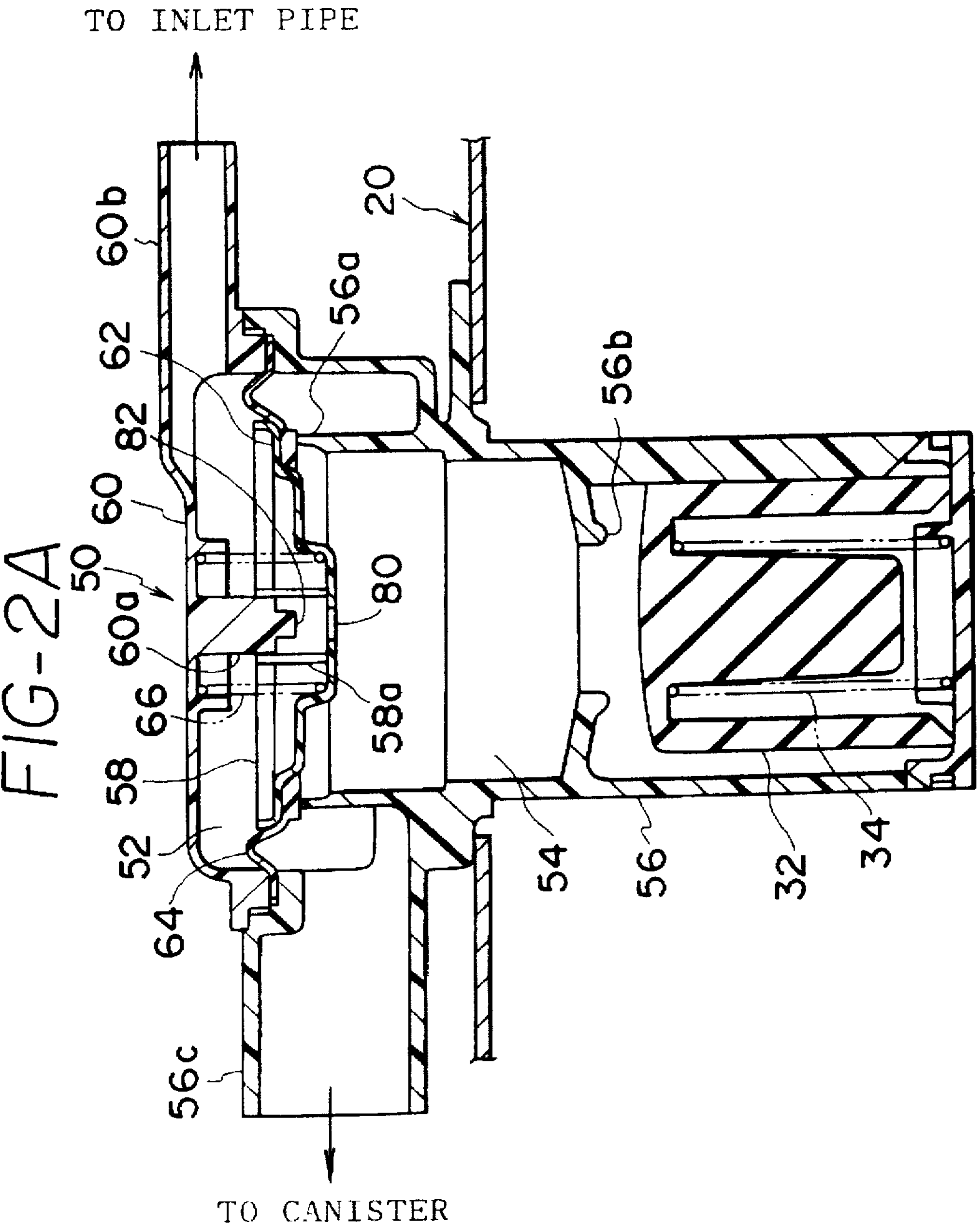
FIG. 2A is a longitudinal cross-sectional view showing a state in which a differential pressure regulating valve shown in FIG. 1 is closed.
Figure 3:
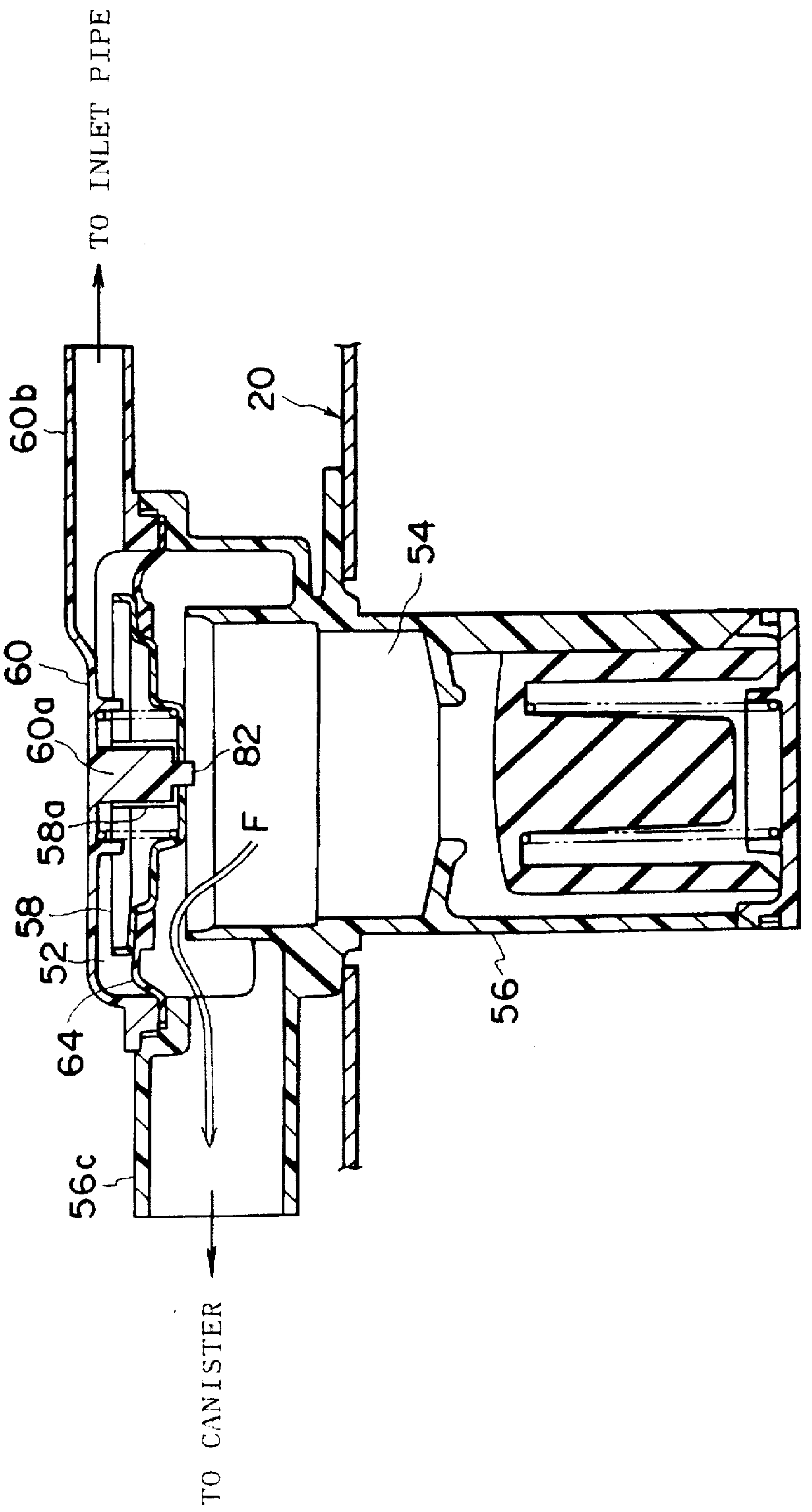
FIG. 3 is a longitudinal cross-sectional view showing a state in which the differential pressure regulating valve shown in FIG. 1 is open.
Figure 4:
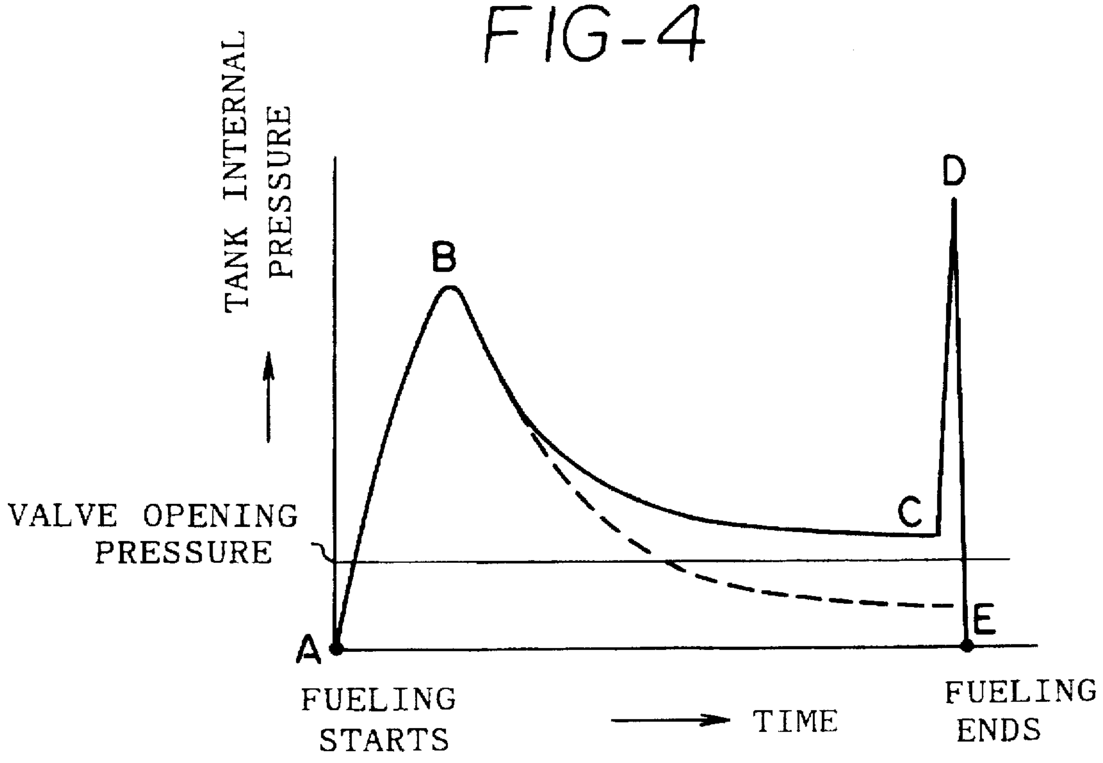
FIG. 4 is a graph which illustrates an internal pressure condition of a fuel tank during fueling.

FIG. 1 is an overall diagram of an evaporative-fuel emission preventing apparatus of an automobile fuel tank according to a first embodiment of the present invention, FIG. 2A shows a state in which a differential pressure regulating valve is closed, FIG. 2B shows partial details of a valve section 58, FIG. 3 shows a state in which the differential pressure regulating valve is open, and FIG. 4 illustrates an internal pressure condition of a fuel tank when fueling.

In FIG. 1, a fuel tank 20 is equipped with an inlet pipe 26. A fuel cap 28 is provided at a fueling port of the inlet pipe 26 in such a manner as to be capable of tightly sealing the fuel tank 20. A differential pressure regulating valve 50 is mounted onto an upper surface of the fuel tank 20 and a low pressure section 52 of the differential pressure regulating valve 50 is connected via a conduit 24 to the inlet pipe 28 at a position near the fueling port thereof. Further, a high pressure section 54 of the differential pressure regulating valve 50 is connected to the fuel tank 20. Numeral 22 is a canister which, with the differential pressure regulating valve 50 being open, evaporative fuel within the fuel tank 20 is introduced into through the differential pressure regulating valve 50 and a conduit 30.

As shown in FIG. 2A, the differential pressure regulating valve 50 includes a body case section 56, a valve section 58 and a lid section 60. The case section 56 serves as a differential pressure regulating valve-fixing portion which is connected to the fuel tank 20. The valve section 58 serves as a differential pressure regulating valve-moving portion, integrally with which a sealing member 62 and a diaphragm 64 are formed. The above-described low pressure section 52 is formed by the valve section 58, the diaphragm 64 and the lid section 60 and the above-described high pressure section 54 is formed by the valve section 58, the diaphragm 64 and the body case section 56. Namely, the low pressure section 52 and the high pressure section 54 of the differential pressure regulating valve 50 are separated from each other by the valve section 58 and the diaphragm 64.

A conduit 56*c*, which forms a part of a passageway for connecting the fuel tank 20 and the canister 22, is provided above the case section 56 so as to be capable of communicating with the canister 22. The conduit 56*c* includes a sealing seat 56*a* on which, with the differential pressure regulating valve 50 closed, the sealing member 62 of the valve section 58 abuts so as to tightly seal and shut off the passageway for connecting the fuel tank 20 and the canister 22.

A public-known float 32 is provided at a lower portion of the case section 56. The float 32 is adapted to, when fueling, move upwardly as a fuel liquid surface rises and abut against a float valve sealing seat 56*b* of the case section 56 to regulate the fuel liquid surface. Numeral 34 is a spring which, when buoyancy is generated on the float 32 in a lower direction of the paper of FIG. 2, is provided to operate against the buoyancy.

The sealing member 62 and the diaphragm 64 are respectively formed integrally with the valve section 58. The sealing member 62 abuts against the sealing seat 56*a* of the case section 56 to close the differential pressure regulating valve 50 and the diaphragm 64 supports the valve section 58 such that the valve section 58 can move in a vertical direction. Further, the valve section 58 includes guide pieces 58*a* which are disposed with spaces therebetween. A communicating hole 80 is provided substantially at the center of the valve section preferably at a lowermost position of the valve section 58. The communicating hole 80 serves as a communicating member for connecting the low pressure section 52 and the high pressure section 54 of the differential pressure regulating valve 50.

The lid section 60 includes a convex portion 60*a* and a projection 82 is formed at a distal end of the convex portion 60*a*. The projection 82 has a diameter which is slightly smaller than an inner diameter of the communicating hole 80 in the valve section 58 and serves as a passing gas quantity-limiting member for limiting the quantity of passing gas of evaporative fuel through the communicating hole 80 when fueling. Further, a conduit **60*b* is formed integrally with the lid section 60 and forms a part of a passageway which is connected to a vicinity of the fueling port of the inlet pipe 26**.

Next, an operation of the first embodiment will be described.

When the fuel cap 28 is closed, in FIG. 2A, the pressures in the low pressure section 52 and the high pressure section 54 are the same. The differential pressure regulating valve 50 is closed with the sealing member 62 of the valve section 58 being urged against the sealing seat **56*a* of the case section 56 by elastic force of a spring 66 which is provided in a space of the low pressure section 52, so that the passageway for connecting the fuel tank 20 and the canister 22** is tightly sealed and shut off.

At this time, liquid fuel flowing from the vicinity of the fueling port of the inlet pipe 26 into the low pressure section 52 through the conduit 24 and the conduit **60*b*, or liquid fuel generated in such a manner that evaporative fuel within the conduits 24, 60*b* or within the low pressure section 52 is cooled and liquefied is returned to the fuel tank 20 through the communicating hole 80 provided in the valve section 58**.

When the fuel cap 28 is open for fueling or the like, as shown in FIG. 3, the fueling port of the inlet pipe 26 is open to the atmosphere and the low pressure section 52 communicates with the fueling port of the inlet pipe 26 via the conduit **60*b* of the lid section 60. For this reason, the low pressure section 52 is changed from a high pressure condition (i.e., tank internal pressure) to a low pressure condition (i.e., atmospheric pressure). The high pressure section 54 communicates with the fuel tank 20 and the pressure thereof becomes low later than the low pressure section 52. The differential pressure regulating valve 50 is adapted to open on the basis of the difference in pressure between the low pressure section 52 and the higher pressure section 54 at the beginning of the period of time when the fuel cap 28** is open.

Further, when fueling, the pressure in the vicinity of the fueling port of the inlet pipe is low (i.e., atmospheric pressure) and the pressure in the high pressure section 54 becomes positive pressure due to a rise of the fuel liquid surface which is caused by injection of fuel. The differential pressure regulating valve 50 opens due to this difference in pressure between the low pressure section 52 and the high pressure section 54. The opening operation of the differential pressure regulating valve 50 is effected in such a manner that the guide pieces **58*a* provided in the valve section 58 move upward along the convex portion 60*a* formed in the lid section 60 with the valve section 58 being supported by the diaphragm 64**.

As indicated by arrow F in FIG. 8, evaporative fuel generated within the fuel tank 20 is introduced into the canister 22 through the conduit **56*c* of the case section 56 and is processed by being adsorbed by activated carbon in the canister 22**.

At this time, the valve section 58 moves upward synchronous with the opening of the differential pressure regulating valve 50, so that the projection 82 provided at the distal end of the convex portion **60*a* of the lid section 60 is fitted into the communicating hole 80 formed in the valve section 58 and an opening area of the communicating hole 80 accordingly becomes smaller. The quantity of passing gas of the evaporative fuel flowing into the low pressure section 52 through the communicating hole 80 is accordingly limited. Namely, an amount of the evaporative fuel which is discharged from the inlet pipe 26 into the atmosphere through the communicating hole 80, the conduit 60*b* and the conduit 24 can be restrained. Thus, it is possible to alleviate decrease in pressure within the fuel tank 20 which is caused by the evaporative fuel flowing into the low pressure section 52, and an opened state of the differential pressure regulating valve 50** can be maintained.

The above-described operation will be described further with reference to FIG. 4.

As indicated by the solid line in FIG. 4, for the time from a fueling starting point A to the point of time B, a gas space within the fuel tank 20 is pressurized as the fuel liquid surface moves upward and the pressure within the fuel tank 20 gradually becomes higher. Due to the increase of the internal pressure in the fuel tank for the time between A and B, and the low pressure (i.e., atmospheric pressure) in the vicinity of the fueling port of the inlet pipe 26, the difference in pressure occurs between the low pressure section 52 and the high pressure section 54 and the differential pressure regulating valve 50 comes up to a valve opening pressure, and therefore, opens.

Within the fuel tank 20 for the time between A and B, the evaporative fuel moves irregularly within the fuel tank 20 by force of injection of fuel. Accordingly, the evaporative fuel is difficult to flow into the canister 22, and even after the differential pressure regulating valve 50 has opened in a state of exceeding the valve opening pressure, the tank internal pressure further becomes higher due to the rise of the fuel liquid surface.

Within the fuel tank 20 for the time between B and C, the evaporative fuel begins to be introduced into the canister 22 through the differential pressure regulating valve 50, the decrement of gas space within the fuel tank 20 which is caused by the rise of the fuel liquid surface and the amount of the evaporative fuel introduced into the canister 22 gradually approach to each other, and the tank internal pressure continues to decrease until the above-described decrement of the gas space and the amounts of the evaporative fuel becomes equal. For the time between B and C, the projection 82 is fitted into the communicating hole 80 and the opening area of the communicating hole 80 is made smaller. For this reason, the evaporative fuel is prevented from flowing into the low pressure section 52 through the communicating hole 80 and the decrease in pressure within the fuel tank 20, which is caused by the evaporative fuel flowing into the low pressure section 52, is prevented. Thus, the tank internal pressure can be maintained to be higher than the valve opening pressure of the differential pressure regulating valve 50 to an fueling ending point E, so that the differential pressure regulating valve 50 is held in an opened state and the evaporative fuel can be introduced into the canister 22. Supposing that the projection 82 is not provided, when the opening area of the communicating hole 80 is made excessively large, the evaporative fuel flowing into the low pressure section 52 through the communicating hole 80 increases. In this case, as shown in the broken line in FIG. 4, there is a possibility that the valve opening pressure of the differential pressure regulating valve 50 cannot be maintained until completion of fueling.

Meanwhile, a rapid change of the tank internal pressure from point D to point E is caused in such a manner that the float 32 effects a valve closing operation with the fuel tank 20 being fully provided with fuel and an automatic stopping function of a fuel injection gun (not shown) acts subsequent to the closing operation of the float 32 to rapidly complete fueling.

The above-described embodiment is constructed in that the projection which is provided in the lid section of the differential pressure regulating valve to serve as a passing gas quantity-limiting member is fitted into the communicating hole which is provided in the valve section, i.e., the moving portion of the differential pressure regulating valve, and serves as the communicating member, so that the quantity of the passing gas through the communicating hole can be controlled. However, so long as the quantity of the passing gas in the communicating hole can be limited, the projection needs not necessarily be fitted into the communicating hole.

Further, only if the communicating member be provided to return the liquid fuel introduced into the low pressure section of the differential pressure regulating valve to the fuel tank, the communicating member may be located at other position than that at the moving portion of the differential pressure regulating valve. For example, the low pressure section and the fuel tank directly communicate with each other by a pipe which allows communication between the low pressure section and the fuel tank, so that the liquid fuel may be returned to the interior of the fuel tank.

By using a fuel-permeable material as the communicating member for the differential pressure regulating valve, the liquid fuel may be returned to the interior the fuel tank.

Further, in the above-described embodiment, the quantity of passing gas in the communicating hole is limited by providing, in the moving portion of the differential pressure regulating valve, the communicating hole which is the communicating member, and by providing, in the lid section, the projection which is the passing gas quantity-limiting member. However, the quantity of the passing gas in the communicating hole may also be controlled in a state in which the communicating hole is provided at other position than that of the moving portion of the differential pressure regulating valve and the passing gas quantity-limiting member is provided in the moving portion thereof.

In the evaporative-fuel emission preventing apparatus according to the first embodiment, the liquid fuel introduced into the low pressure section of the differential pressure regulating valve is returned to the fuel tank by the communicating member which allows communication between the low pressure section and the fuel tank, and therefore, the liquid fuel is not stored in the low pressure section and the opening operation of the differential pressure regulating valve can be smoothly effected.

Further, since the quantity of the passing gas of the evaporative fuel which flows into the low pressure section through the communicating member when fueling is limited by the passing gas quantity-limiting member, the differential pressure regulating valve can be maintained at the valve opening pressure until the completion of fueling and the evaporative fuel can be introduced into the canister. Further, an amount by which the evaporative fuel is discharged from the inlet pipe into the atmosphere can be restrained by the passing gas quantity-limiting member.

Figure 5:
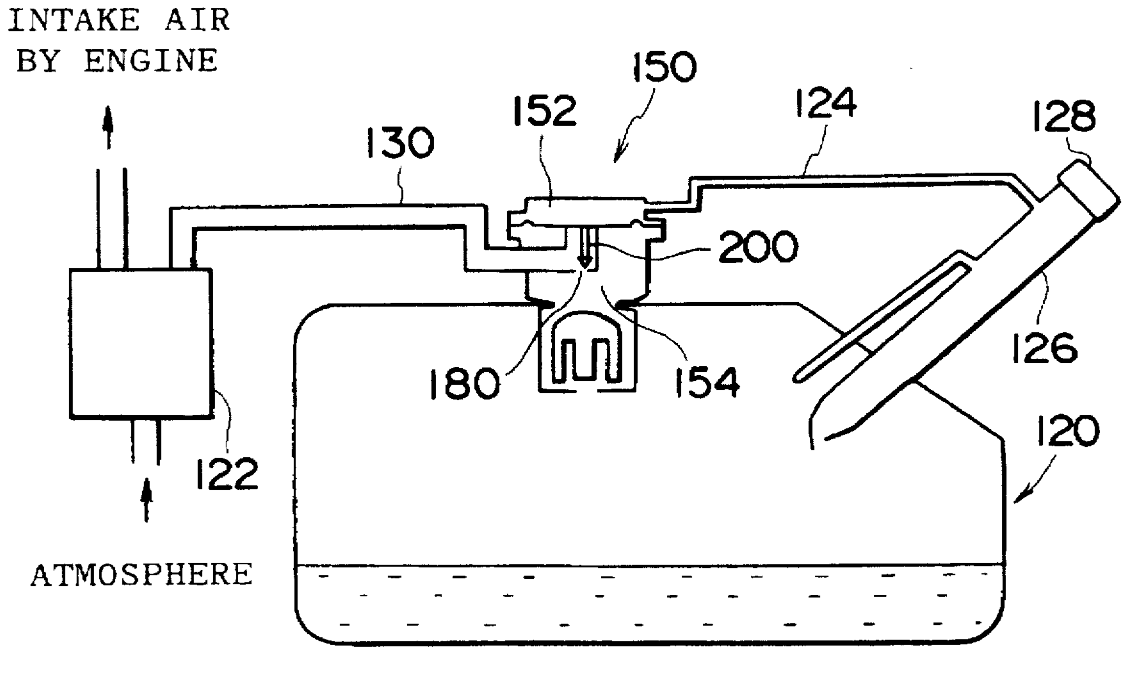
FIG. 5 is an overall diagram of an evaporative-fuel emission preventing apparatus of an automobile fuel tank according to a second embodiment of the present invention.
Figure 6B:
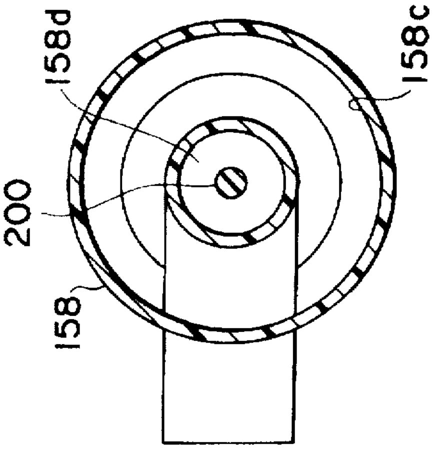
FIG. 6B is a cross-sectional view taken along the line of b—b in FIG. 6A.
Figure 6A:
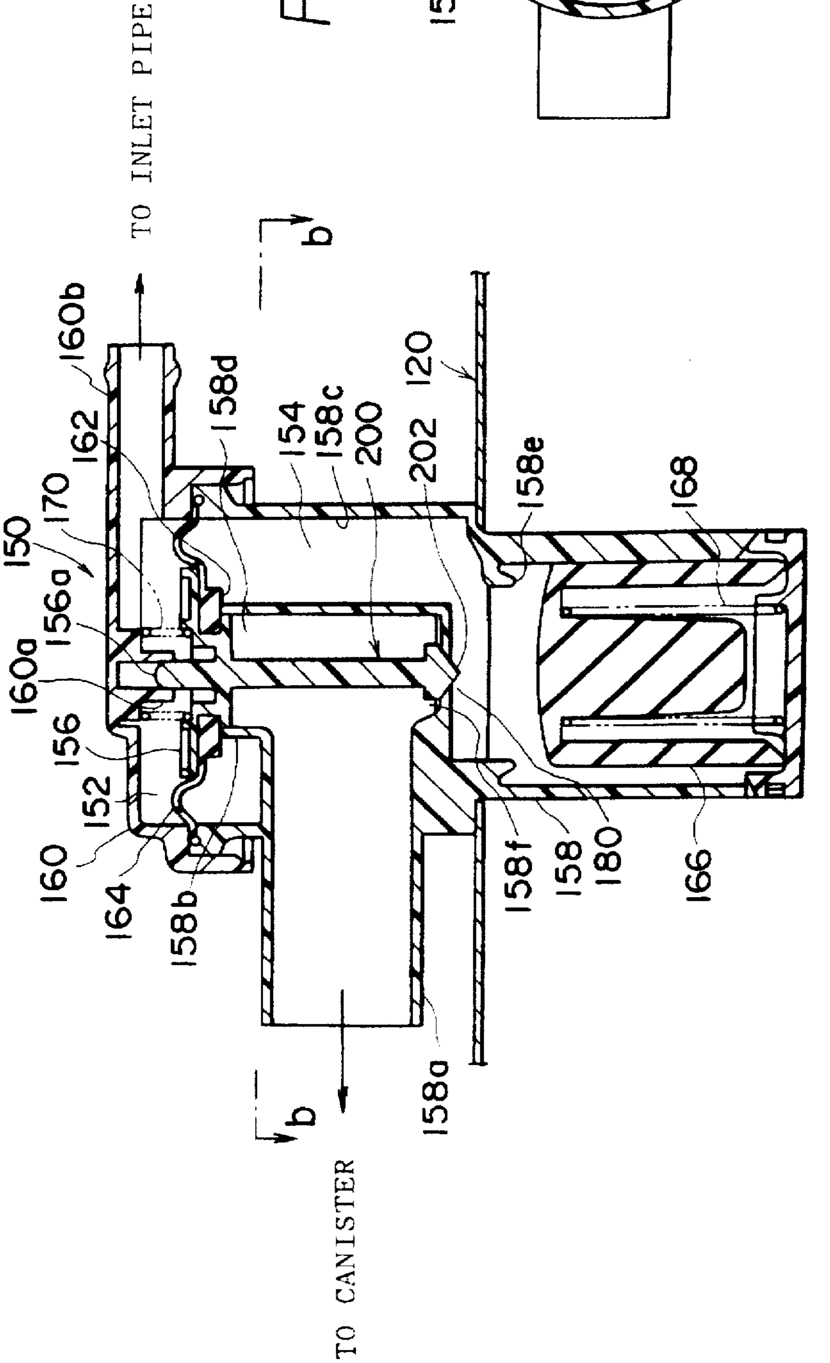
FIG. 6A is a longitudinal cross-sectional view showing a state in which a differential pressure regulating valve which is an opening/closing valve shown in FIG. 5 is closed.
Figure 7:
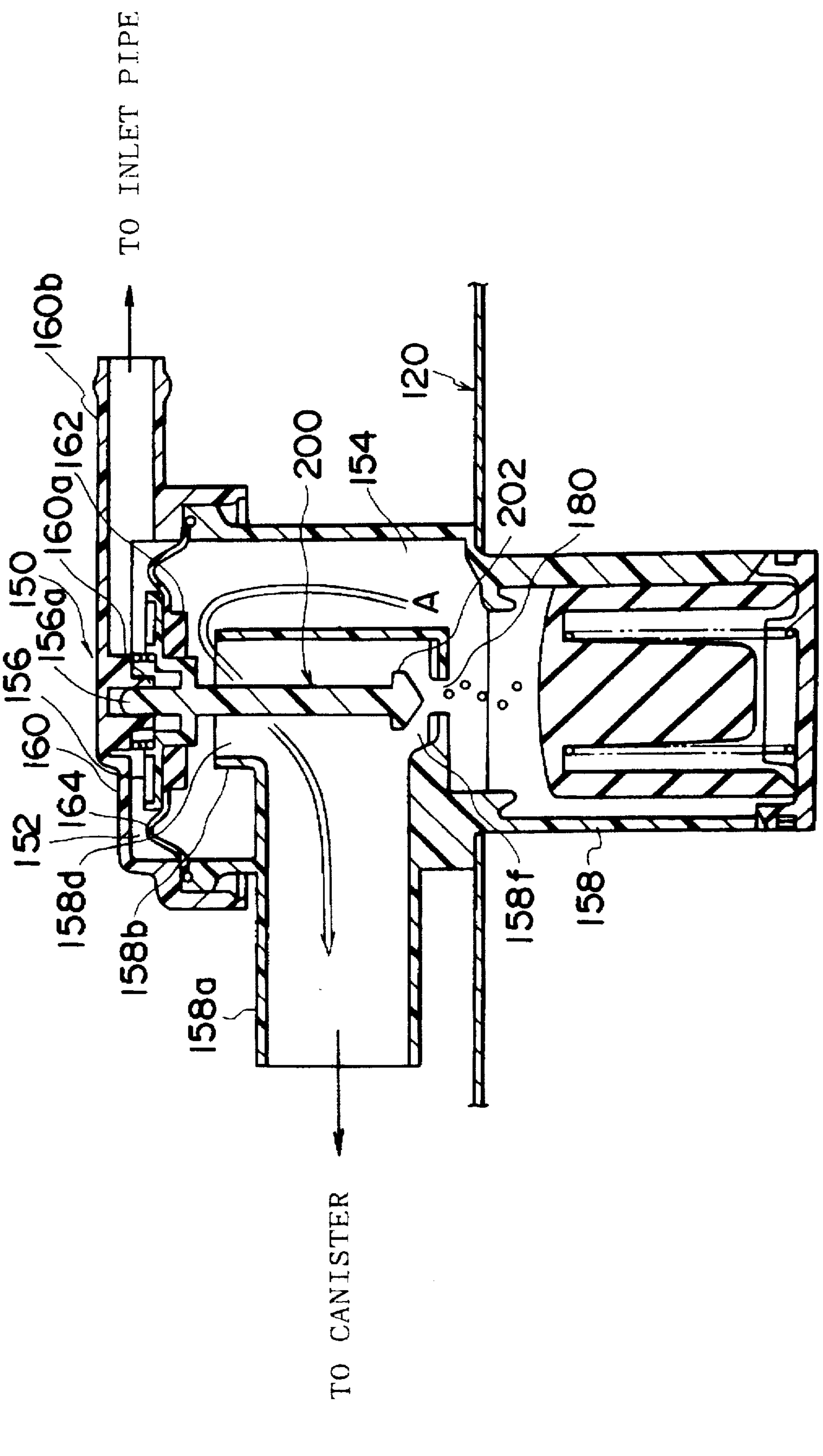
FIG. 7 is a longitudinal cross-sectional view showing a state in which the differential pressure regulating valve which is an opening/closing valve shown in FIG. 5 is open.

A description will be hereinafter given of an evaporative-fuel emission preventing apparatus according to a second embodiment of the present invention with reference to FIGS. 5 through 7. FIG. 5 is an overall diagram of the evaporative-fuel emission preventing apparatus according to the second embodiment, FIG. 6A shows a state in which a differential pressure regulating valve which is an opening/closing valve shown in FIG. 5 is closed, FIG. 6B is a cross-sectional view taken along the line of b—b in FIG. 6A, and FIG. 7 shows a state in which the differential pressure regulating valve which is an opening/closing valve shown in FIG. 5 is open.

First, the evaporative-fuel emission preventing apparatus of the second embodiment is schematically described with reference to FIG. 5.

In FIG. 5, a fuel tank 120 is equipped with an inlet pipe 126. A fuel cap 128 is provided at a fueling port of the inlet pipe 126 in such a manner as to be capable of tightly sealing the fuel tank 120. A differential pressure regulating valve 150 which is an opening/closing valve is mounted onto an upper surface of the fuel tank 120 and a low pressure section 152 of the differential pressure regulating valve 150 is connected via a conduit 124 to the inlet pipe 126 at a position near the fueling port of the inlet pipe 126. A high pressure section 154 of the differential pressure regulating valve 150 is connected to the fuel tank 120. Numeral 122 is a canister which is connected to the fuel tank 120 via the differential pressure regulating valve 150 and a conduit 130. Meanwhile, the high pressure section 154 corresponds to a first passageway for connecting the fuel tank and the opening/closing valve and the conduit 130 corresponds to a second passageway for connecting the opening/closing passageway and the canister.

When the vehicle is running, the differential pressure regulating valve 150 is usually closed and a passageway for connecting the fuel tank 120 and the canister 122 is shut off. At this time, an interior of the canister 122 is taken in by an engine intake manifold (not shown), which results in that the atmosphere is introduced into the canister 122 and evaporative fuel adsorbed into activated carbon of the canister 122 when fueling is introduced into an engine and processed therein. Further, an interior of the conduit 130 is also, together with the canister 122, taken in by the engine intake manifold and is set in a negative pressure condition.

When fueling, the differential pressure regulating valve 150 is opened and the passageway between the fuel tank 120 and the canister 122 is open. The evaporative fuel within the fuel tank 120 is introduced into the canister 122 and is adsorbed into the activated carbon of the canister 122. Meanwhile, prior to fueling, an air intake operation of the engine intake manifold has been usually completed.

A description will be hereinafter given of details of the second embodiment with reference to FIGS. 6A, 6B and 7.

In FIG. 6A, the differential pressure regulating valve 150 includes a valve section 156, a body case section 158 and a lid section 160.

A sealing member 162 and a diaphragm 164 are respectively formed integrally with the valve section 156. The valve section 156, sealing member 162 and diaphragm 164 form a moving portion for effecting an opening and closing movement of the differential pressure regulating valve 150. Further, an interlocking valve 200 is provided integrally with the valve section 156 to interlock with the opening and closing operation of the valve section 156. A valve body 202 is provided at the distal end of the interlocking valve 200. The valve body 202 has a tapered portion which is tapered down in a direction in which the valve section 156 closes.

A conduit 158*a* is disposed above the body case section 158 and can communicate with the canister 122 in a state of being connected to the above-described conduit 130. The conduit 158*a* includes a sealing seat 158*b* on which the sealing member 162 of the valve section 156 abuts to shut off the passageway for connecting the fuel tank 120 and the canister 122. The sealing seat 158*b* is disposed substantially at the center of the case section 156 with a space interposed between the sealing seat 158*b* and a case section inner wall 158*c*. An inner opening portion 158*d* of the sealing seat 158*b* opens upward. Further, a sump portion 158*f* is provided at a position which is lower than one surface of the conduit 158a and a communicating hole 180 is formed on a lower surface of the sump portion 158f.

A float 166 is provided at a lower portion of the body case section 158. The float 166 is adapted to, when fueling, move upwardly as a fuel liquid surface rises and abut against a float valve sealing seat 158e of the case section 158 to regulate the fuel liquid surface. Numeral 168 is a spring which, when buoyancy is generated on the float 166 in a lower direction of the paper of FIG. 6A, is provided to operate against the buoyancy.

A guide 160a and a conduit 160b are respectively formed integrally with the lid section 160. The guide 160a is formed such that a projection 156a of the valve section 156 is slidably fitted thereinto, and the conduit 160b forms a part of the passageway connected to the vicinity of the fueling port of the inlet pipe 126.

Meanwhile, the conduit 158a corresponds to a second passageway for connecting the opening/closing valve and the canister, the communicating hole 180 corresponds to a communicating portion for connecting the second passageway and the fuel tank, and the interlocking valve 200 corresponds to a communicating/shut-off valve for selectively opening and shutting off the communicating portion.

With the valve section 156, body case section 158 and lid section 160 being assembled, the low pressure section 152 of the differential pressure regulating valve 150 is formed by the valve section 156, the diaphragm 164 and the lid section 160, and the high pressure section 154 is formed by the valve section 156, diaphragm 164 and body case section 158. It should be noted that the low pressure section 152 and the high pressure section 154 are tightly sealed and separated by the valve section 156 and the diaphragm 164.

Next, an operation of the second embodiment will be described.

When the fuel cap 128 is closed and the fuel tank 120 is tightly sealed, in the state shown in FIG. 6A, the pressures in the low pressure section 152 and the high pressure section 154 of the differential pressure regulating section 150 are the same. The sealing member 162 of the valve section 156 is urged against the sealing seat 158b of the case section 158 by elastic force of a spring 170 provided within a space of the low pressure section 152, so that the differential pressure regulating valve 150 is closed. Thus, the passageway for connecting the fuel tank 120 and the [ca]nister 122 is tightly sealed and shut off.

At this time, the valve body 202 of the interlocking valve 200 provided in the valve section 156 together with the valve section 156 is urged by the elastic force of the spring 170 and the communicating hole 180 formed in the conduit 158a is closed by the valve body 202 of the interlocking valve 200 from inside of the conduit 158a.

When the fuel tank 128 is open for fueling or the like and the fueling port of the inlet pipe 126 is open to the atmosphere, in the state shown in FIG. 7, the low pressure section 152 is changed from a high pressure condition (i.e., tank internal pressure) to a low pressure condition (i.e., atmospheric pressure), because the low pressure section 152 is connected to the vicinity of the fueling port of the inlet pipe 126 via the conduit 160b of the lid section 160. Further, the high pressure section 154 communicates with the fuel tank 120, and therefore the pressure thereof becomes low later than the low pressure section 152. Thus, the differential pressure regulating valve 150 opens on the basis of the difference in pressure between the low pressure section 152 and the high pressure section 154 at the beginning of the period of time when the fuel cap 128 is open. Meanwhile, the opening operation of the differential pressure regulating valve 150 is effected in such a manner that the projection 156a of the valve section 156 slides on the guide 160a of the lid section, the valve section 156 is supported by the diaphragm 164 and the sealing member 162 moves upward apart from the sealing seat 158b of the case section 158.

As indicated by arrow A in FIG. 7, the evaporative fuel to be introduced into the canister 122 mainly flows through the opening portion 158d of the conduit 158a whose opening area is larger than the communicating hole 180. The evaporative fuel within the fuel tank 120 (which is one generated within the fuel tank 120 due to an increase in temperature of the fuel when the fuel cap 128 is closed) is introduced into the canister 122 via the differential pressure regulating valve 150.

When fueling, the low pressure section 152 is set in a low pressure (i.e., atmospheric pressure) condition and the high pressure section 154 becomes positive pressure due to a rise of the fuel liquid surface caused by injection of fuel. Thus, the differential pressure regulating valve 150 opens on the basis of the difference in pressure between the low pressure section 152 and the high pressure section 154.

Then, as indicated by arrow A in FIG. 7, the evaporative fuel generated within the fuel tank 120 due to injection of fuel is introduced into the canister 122 via the differential pressure regulating valve 150 in a manner similar to the aforementioned.

When the differential pressure regulating valve 150 is open, the valve body 202 of the interlocking valve 200 provided in the valve section 156 moves synchronous with the opening operation of the valve section 156 which is caused by opening of the differential pressure regulating valve 150 and is separated from and opens the communicating hole 180. This allows communication between the conduit 158a and the fuel tank 120.

When the liquid fuel is stored in the vicinities of the communicating hole 180 formed on the lower surface of the sump section 158f of the conduit 158a, the liquid fuel drops down by its own weight and is returned to the fuel tank 120 through the communicating hole 180.

Further, even in other case than when fueling, if the valve section 156 of the differential pressure regulating valve 150 moves upward due to running vibration of a vehicle or the like to open, the interlocking valve 200 also opens by moving together with the valve section 156. At this time, when intake of air by the engine is stopped and an interior of the conduits 158a is not negative pressure, the liquid fuel stored in the vicinities of the communicating hole 180 formed on the lower surface of the sump section 158f of the conduit 158a drops down by its own weight and is returned to the fuel tank 120 through the communicating hole 180 each time the interlocking valve 200 opens.

Figure 8B:
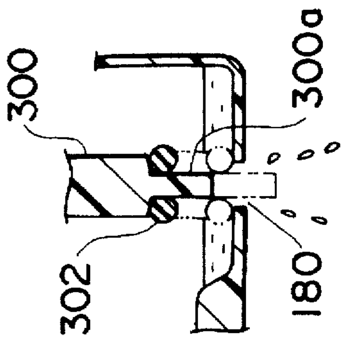
FIG. 8B is a cross-sectional view showing partial details of an interlocking valve.
Figure 8A:
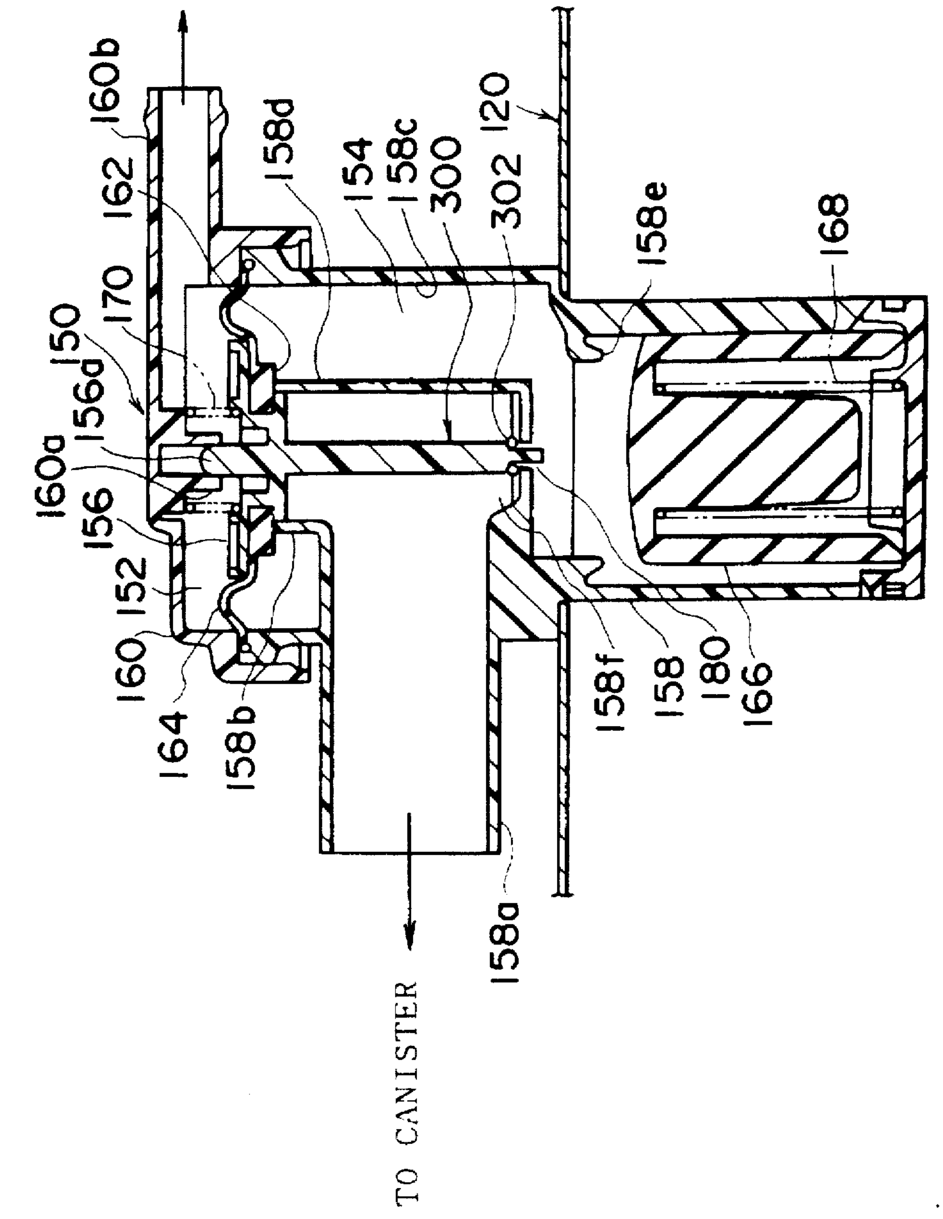
FIG. 8A is a longitudinal cross-sectional view of an evaporative-fuel emission preventing apparatus according to a third embodiment of the present invention, which shows a state in which the differential pressure regulating valve which is an opening/closing valve is closed.

A description will be hereinafter given of an evaporative-fuel emission preventing apparatus according to a third embodiment of the present invention by referring to FIGS. 8A and 8B. FIG. 8A shows a state in which the differential pressure regulating valve which is an opening/closing valve is closed and FIG. 8B shows details of a portion in the vicinities of the communicating hole 180 which is the communicating portion. It should be noted that the same descriptions as those of the second embodiment will be partially omitted.

As shown in FIG. 8A, an interlocking valve 300 serving as a communicating/cutoff valve is formed integrally with the valve section 156 of the differential pressure regulating valve 150. A convex portion 300*a* (FIG. 8B) serving as a passing gas quantity-limiting member is provided at the distal end of the interlocking valve 300. Further, an O ring 302 is fitted and fixed to the convex portion 300*a*.

With the differential pressure regulating valve 150 closed, the O ring 302 of the interlocking valve 300 together with the valve section 156 is urged by elastic force of the spring 170 and the communicating hole 180 is closed by the O ring 302 from inside of the conduit 158*a*. The convex portion 300*a* is slidably fitted into an opening of the communicating hole 180. The length of the convex portion 300*a* is set shorter than the maximum valve opening stroke of the differential pressure regulating valve 150.

When the interior of the conduit 158*a* becomes negative pressure due to the intake of air by the engine, even if the differential pressure regulating valve 150 opens due to running vibration of the vehicle, the quantity of passing air of the evaporative fuel introduced from the fuel tank 120 into the conduit 158*a* through the communicating hole 180 is controlled so long as the convex portion 300*a* slides on the communicating hole 180. Thus, the state in which the liquid fuel stored in the sump section 158*f* is introduced into the canister 122 together with the evaporative fuel is prevented.

FIG. 8B shows the state in which the differential pressure regulating valve 150 is open substantially at the maximum when fueling. At this time, the convex portion 300*a* moves upward across the opening of the communicating hole 180. As described above, the evaporative fuel flows into the canister 122 through the opening portion 158*d* of the conduit 158*a* with the differential pressure regulating valve 150 being open. The liquid fuel stored in the vicinities of the communicating hole 180 which is formed on the lower surface of the sump section 158*f* of the conduit 158*a* drops down by its own weight and is returned to the fuel tank 120 through the communicating hole 180.

Figure 9A:
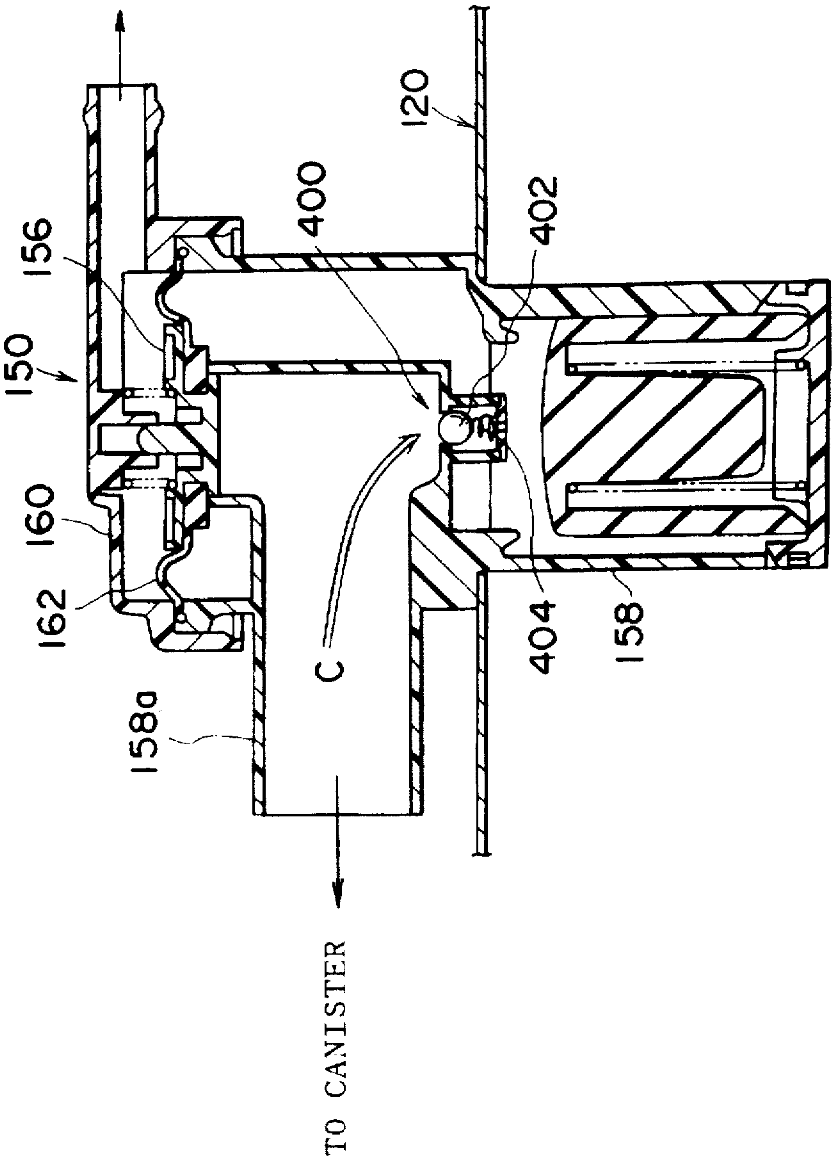
FIG. 9A is a longitudinal cross-sectional view of an evaporative-fuel emission preventing apparatus according to a fourth embodiment of the present invention, which shows a state in which the differential pressure regulating valve which is an opening/closing valve is closed.
Figure 9B:
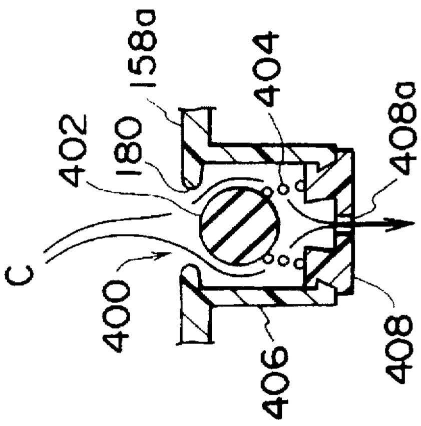
FIG. 9B is a cross-sectional view showing partial details of a negative pressure valve.

A description will be hereinafter given of an evaporative-fuel emission preventing apparatus according to a fourth embodiment of the present invention by referring to FIGS. 9A and 9B. FIG. 9A shows a state in which the differential pressure regulating valve which is an opening/closing valve is closed, and FIG. 9B shows partial details of a negative pressure valve serving as a communicating/cutoff valve which will be described later, with the negative pressure valve being open. It should be noted that the same descriptions as those of the above-described embodiments will be partially omitted.

As shown in FIG. 9A, the communicating hole 180 is formed on the lower surface of the sump section 158*f* in the conduit 158*a* and serves as the communicating portion for connecting the conduit 158*a* and the fuel tank 120. The conduit 158*a* is equipped with a negative pressure valve 400. The negative pressure valve 400 is formed from a valve body 402 which closes the communicating hole 180 from the side of the fuel tank 120, a spring 404 which urges the valve body 402, a case 406 formed integrally with the conduit 158*a* to accommodate the valve body 402, and a cap 408 having an opening 408*a*. Meanwhile, the negative pressure valve 400 corresponds to the communicating/cutoff valve.

Next, an operation of the fourth embodiment will be described.

The pressure within the fuel tank 120 becomes positive pressure due to an increase in temperature of fuel during running of the vehicle. However, when the temperature of the fuel decreases some time after when the vehicle has stopped running, the pressure within the fuel tank 120 becomes negative pressure due to contraction of evaporative fuel. At this time, the valve body 402 moves away from the communicating hole 180 against elastic force of the spring 404 so as to open the negative pressure valve 400 and opens the communicating hole 180. This allows communication between the conduit 158*a* and the fuel tank 120.

As indicated by arrow C in FIGS. 9A and 9B, air flows from the side of the canister 122 to the fuel tank 120. When the liquid fuel is stored in the vicinities of the communicating hole 180 formed on the lower surface of the sump section 158*f* of the conduit 158*a*, the liquid fuel drops down and is returned to the fuel tank 120 in a manner of being pushed out by flow of air.

As described in the above-described second, third and fourth embodiments, the interlocking valve 200, interlocking valve 300 and negative pressure valve 400 each of which serves as the communicating/cutoff valve are selectively provided to pass through the communicating hole 180 which is the communicating portion, and the liquid fuel stored in the passageway for connecting the canister 122 and the differential pressure regulating valve 150 which is the opening/closing valve is returned to the fuel tank 120. This makes it possible to reduce the amount of the liquid fuel to be processed by the canister 122 and to decrease the amount of activated carbon of the canister 122. As a result, the canister 122 can be made smaller.

Meanwhile, the above-described second, third and fourth embodiments are each constructed in that the sealing seat 158*b* of the differential pressure regulating valve 150 is disposed substantially at the center of the case section 158 with a space interposed between the body-section inner wall 158C and the sealing seat 158*b* and the inner opening 158 *d* of the sealing seat 158*b* is provided to open facing upward. Here, when the liquid fuel introduced into the case section 158 along the case-section inner wall 158*c* is about to flow into the canister 122 across the sealing seat 158*b* synchronous with unintentional opening of the differential pressure regulating valve 150, the liquid fuel needs move away from the case-section inner wall 158*c* and across a space between the sealing seat 158*b* and the case-section inner wall 158*c* and flow toward the opening 158*d*. Namely, the differential pressure regulating valve 150 is formed such that the liquid fuel is difficult to flow into the passageway on the side of the canister.

In the above-described second, third and fourth embodiments, the interlocking valves 200, 300 and the negative pressure valve 400 are respectively used, but are not necessarily limited thereto. For example, the passageway on the side of the canister and the fuel tank 120 may be selectively connected to each other by opening and closing the communicating portion with an electromagnetic valve or the like being provided.

Further, in the foregoing, the differential pressure regulating valve is used as the opening/closing valve. However, the present invention is not limited to the same, and any opening/closing valve which can be used for the same purpose as the present invention may be used.

Moreover, the communicating portion is provided in the conduit of the differential pressure regulating valve, but it may also be located at other position than that of the conduit. For example, a conduit may be provided with the negative pressure valve serving as the communicating valve in a state in which the second passageway and the fuel tank communicate with each other by the conduit.

The evaporative-fuel emission preventing apparatus according to the second, third and fourth embodiments is constructed in that the communicating portion, which allows communication between the second passageway for connecting the opening/closing valve and the canister, and the fuel tank, is selectively open and shut off by the communicating/cutoff valve, and the second passageway and the fuel tank are provided to communicate with each other by opening the communicating portion. As a result, the liquid fuel within the second passageway is returned to the fuel tank through the communicating portion. Accordingly, it is possible to reduce the amount of the liquid fuel to be processed by the canister and to decrease the amount of activated carbon of the canister, thereby resulting in reduction in size of the canister.

Further, the passing gas quantity-limiting member provided in the interlocking valve which is the communicating/cutoff valve controls the quantity of passing gas of the evaporative fuel which flows from the fuel tank into the canister through the communicating portion in accordance with an opened state of the opening/closing valve and prevents the liquid fuel stored in the second passageway from being introduced into the canister. Accordingly, it is possible to reduce the amount of the liquid fuel to be processed by the canister and to decrease the amount of activated carbon of the canister, thereby resulting in reduction in size of the canister.

Figure 10:
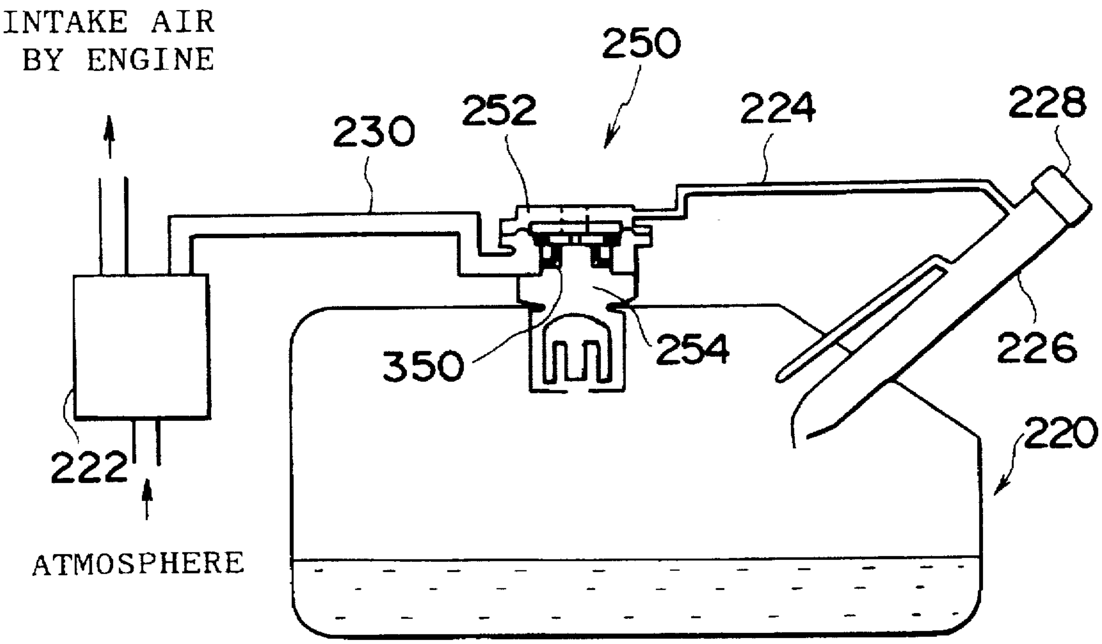
FIG. 10 is an overall diagram of an evaporative-fuel emission preventing apparatus of an automobile fuel tank according to a fifth embodiment of the present invention.

FIG. 10 is an overall diagram of an evaporative-fuel emission preventing apparatus of an automobile fuel tank according to a fifth embodiment of the present invention.

As shown in FIG. 10, a fuel tank 220 is equipped with an inlet pipe 226. A fuel cap 228 is provided at a fueling port of the inlet pipe 226 in such a manner as to be capable of tightly sealing the fuel tank 220. A differential pressure regulating valve 250 which is an opening/closing valve is mounted onto an upper surface of the fuel tank 220 and a low pressure section 252 of the differential pressure regulating valve 250 is connected by a conduit 224 to the inlet pipe 228 at a position in the vicinity of the fueling port of the inlet pipe 226. Further, a high pressure section 254 of the differential pressure regulating valve 250 is connected to the fuel tank 220. Numeral 222 is a canister into which evaporative fuel within the fuel tank 220 is introduced through a conduit 230 when the differential pressure regulating valve 250 is open.

Figure 11A:
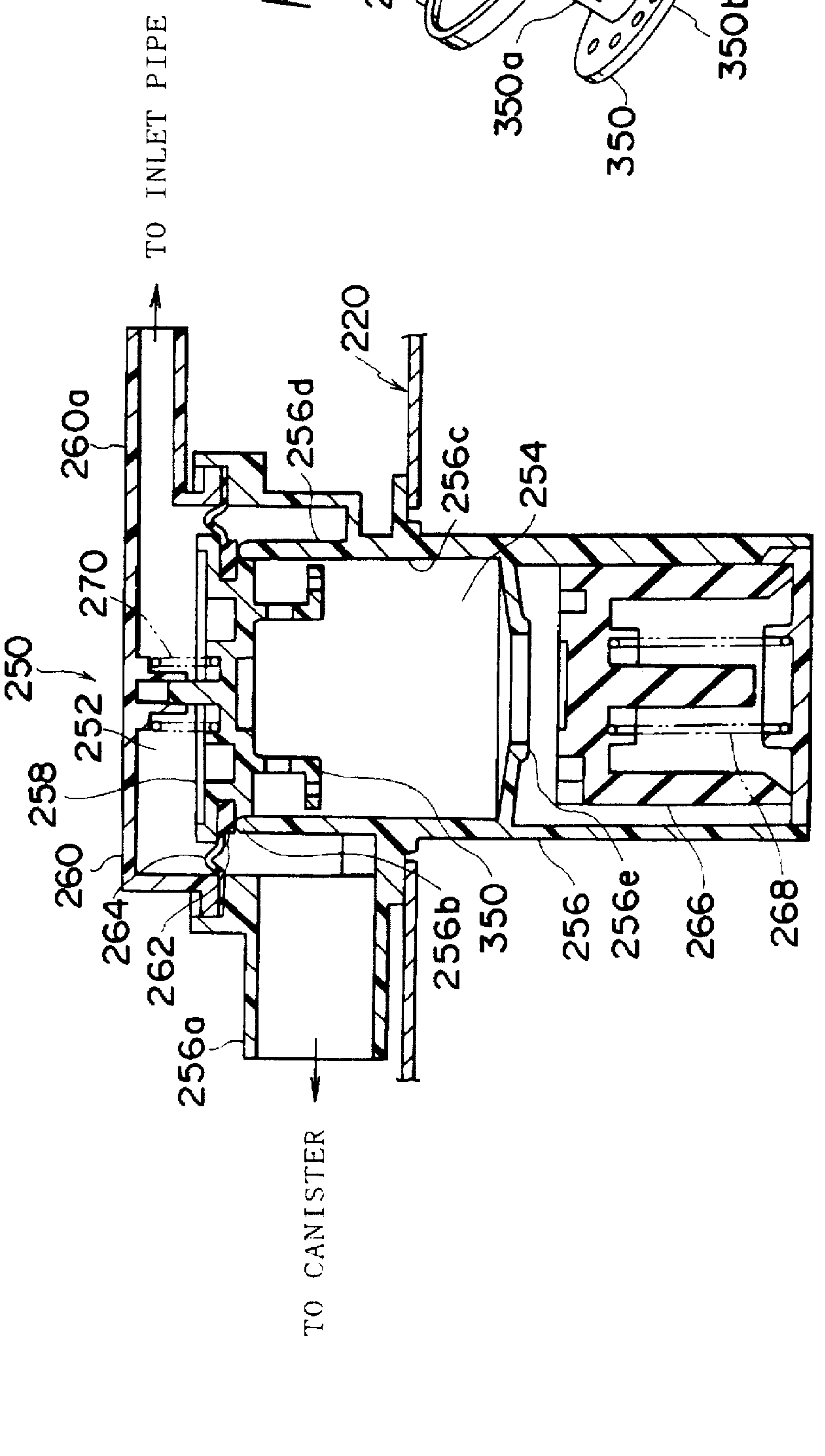
FIG. 11A is a longitudinal cross-sectional view showing a state in which a differential pressure regulating apparatus which is an opening/closing valve shown in FIG. 10 is closed.
Figure 11B:
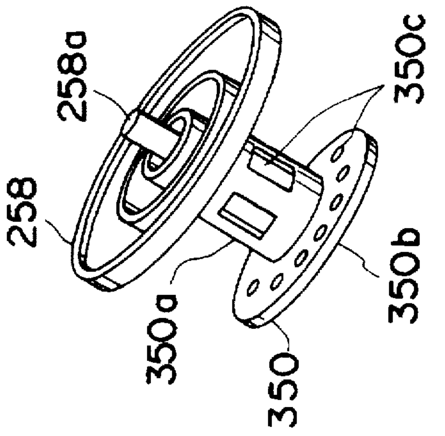
FIG. 11B is a perspective view of a valve section of a moving portion of the differential pressure regulating valve.
Figure 12:
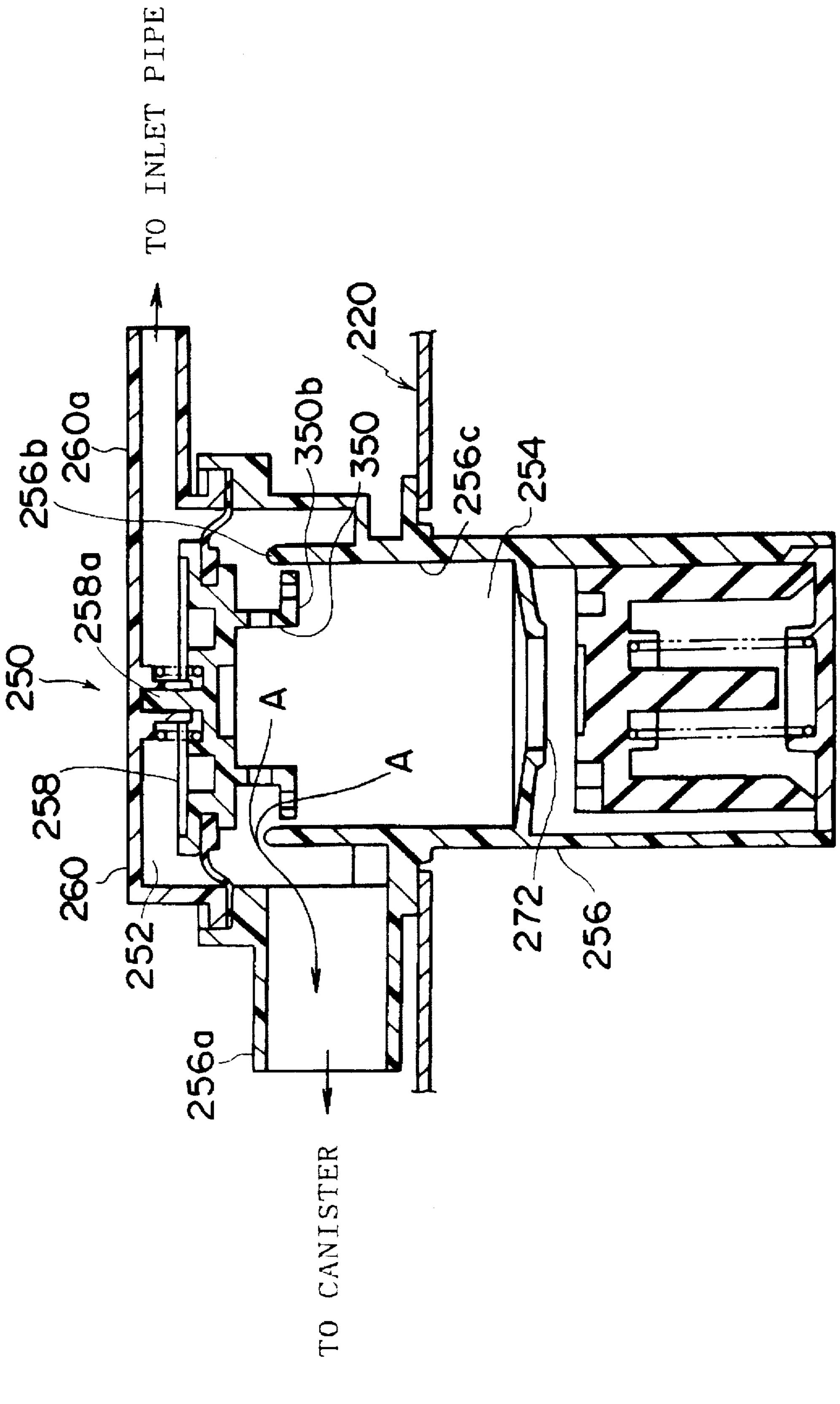
FIG. 12 is a longitudinal cross-sectional view showing a state in which the differential pressure regulating valve which is an opening/closing valve shown in FIG. 10 is open.
Figure 13:
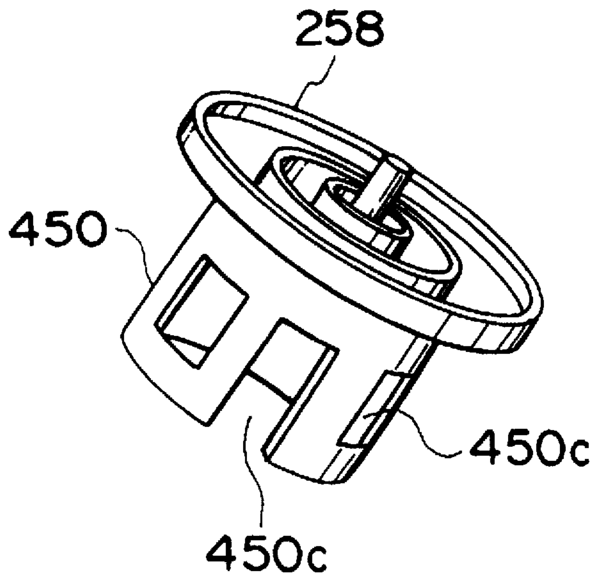
FIG. 13 is a perspective view showing a modified example of the valve section of the moving portion of the differential pressure regulating valve.

FIGS. 11A, 11B and 12 respectively show details of the fifth embodiment: FIG. 11A shows a state in which the differential pressure regulating apparatus which is an opening/closing valve is closed; FIG. 11B is a perspective view of a valve section which is a moving portion of the differential pressure regulating valve; and FIG. 12 shows a state in which the differential pressure regulating valve is open. Further, FIG. 13 is a perspective view showing a modified example of the valve section which is the moving portion of the differential pressure regulating valve.

As shown in FIG. 11A, the differential pressure regulating valve 280 which is the opening/closing valve includes a body case section 256, a valve section 258 and a lid section 260. The body case section 256 serves as a differential pressure regulating valve-fixing portion which is connected to the fuel tank 220. A sealing member 262 and a diaphragm 264 are respectively formed integrally with the valve section 258. The valve section 258, the sealing member 262 and the diaphragm 264 form a differential pressure regulating valve-moving portion. The low pressure section 252 is formed by the valve section 258, the diaphragm 264 and the lid section 260 and the high pressure section 254 is formed by the valve section 258, the diaphragm 264 and the body case section 256. Namely, the low pressure section 252 and the high pressure section 254 of the differential pressure regulating valve 250 are separated from each other by the valve section 258 and the diaphragm 264 in such a manner as to be tightly sealed thereby.

A conduit 256a and a sealing seat 256b are provided above the body case section 256. The conduit 256a forms a part of the passageway for connecting the fuel tank 220 and the canister 222, and the sealing seat 256b is formed such that the sealing member 262 of the valve section 258 abuts against the sealing seat 256b. The conduit section having an inner wall surface 256c and an outer wall surface 256d is provided below the sealing seat 256b on the paper of FIG. 11A.

A float 266 is provided at a lower portion of the case section 256. The float 32 is adapted to, when fueling, move upwardly as a fuel liquid surface rises and abut against a float valve sealing seat 256e of the case section 256 to regulate the fuel liquid surface. Numeral 268 is a spring which, when buoyancy is generated on the float 266 in a lower direction of the paper of FIG. 11A, is provided to operate against the buoyancy.

The sealing member 262 and the diaphragm 264 are respectively formed integrally with the valve section 258. The sealing member 262 is adapted to abut against the sealing seat 256b to close the differential pressure regulating valve 250 and the diaphragm 264 supports the valve section 258 such that the valve section 258 can move in a vertical direction. Further, a gas-liquid separating member 350 is provided integrally with the valve section 258 and is positioned on the side of the inner wall surface 256c of the case section 256 so as to slide on the inner wall surface 256c in a direction in which the differential pressure regulating valve 250 opens and closes.

As shown in FIG. 11B, the gas-liquid separating member 350 is formed from a hollow cylinder section 350a and a circular plate portion 350b and a small clearance is provided between a circumferential surface of the circular plate portion 350b and the inner wall surface 256c of the case section 256 such that the gas-liquid separator member 350 can slide on the inner wall surface 256c. The hollow cylinder section 350a and the circular plate section 350b each have a plurality of opening portions 350c which introduces the evaporative fuel into the canister 222 when fueling.

A conduit 260a is formed integrally with the lid section 260 and forms a part of the passageway which is connected to the vicinity of the fueling port of the inlet pipe 226.

Next, an operation of the fifth embodiment will be described.

In the state shown in FIG. 11A, with the fuel cap 228 being closed, the pressures in the low pressure section 252 and the high pressure section 254 of the differential pressure regulating valve 250 are the same. The differential pressure regulating valve 250 is closed in a state in which the sealing member 262 of the valve section 258 is urged against the sealing seat 256b of the case section 256 by elastic force of a spring 270 provided within a space of the low pressure section 252. As a result, the passageway for connecting the fuel tank 220 and the canister 222 is tightly sealed and shut off.

With the differential pressure regulating valve 250 being closed, even when running vibration of a vehicle or the like are transmitted to the differential pressure regulating valve 250 and the valve section 258 which is the moving portion vibrates irregularly, a horizontal movement of the gas-liquid separating member 350 provided in the valve section 258 is controlled by the circumferential surface of the circular plate section 350*b* and the inner wall surface 256*c* of the case section 256. This makes it possible to prevent misalignment of the sealing seat 256*b* and the sealing member 262 of the case section 256 in the direction in which the differential pressure regulating valve 250 opens and closes and to stabilize sealing properties when the differential pressure regulating valve 250 is closed.

Moreover, even when the running vibration of the vehicle or the like is transmitted to the differential pressure regulating valve 250 and the valve section 258 opens inadvertently against elastic force of the spring 270 and even when the liquid fuel moves within the fuel tank 220 due to rapid turning of the vehicle or the like and flows into the high pressure section 254 of the differential pressure regulating valve 250, the gas-liquid separating member 350 moves synchronous with the movement of the valve section 258 and is interposed between the sealing member 262 and the sealing seat 256*b* to close the opening of the differential pressure regulating valve 250. For this reason, the liquid fuel is prevented from flowing into the canister 222 through the opening of the differential pressure regulating valve 250. Accordingly, the amount of activated carbon of the canister 222 used to process the liquid fuel can be decreased and the canister 222 can be made smaller.

As shown in FIG. 12, when fueling, the fuel cap 228 is open, the fueling port of the inlet pipe 226 is open to the atmosphere, and the low pressure section 252 is changed from a high pressure (i.e., tank internal pressure) to a low pressure (i.e., atmospheric pressure) condition because the low pressure section 252 is connected via the conduit 260*a* of the lid section 260 to the vicinity of the fueling port of the inlet pipe 226. The high pressure section 254 communicates with the fuel tank 220 and therefore, the pressure of the high pressure section 25 becomes low later than the low pressure section 252. Due to the difference in pressure between the low pressure section 252 and the high pressure section 254 at the beginning of the period of time when the fuel cap 228 is open, the differential pressure regulating valve 250 is opened.

Further, when fueling, the low pressure section 252 is set in a low pressure (i.e., atmospheric pressure) condition and the high pressure section 254 becomes positive pressure due to a rise of the fuel liquid surface caused by injection of fuel. Due to the difference in pressure between the low pressure section 252 and the high pressure section 254, the differential pressure regulating valve 250 is opened.

Namely, the sealing member 262 moves upward apart from the sealing seat 256*b* to open the differential pressure regulating valve 250, the gas-liquid separating member 850 moves together with the valve section 258 so that the circumferential surface of the circular plate portion 350*b* slides on the inner wall surface 256*c* of the case section 256 and moves relatively to the fuel tank 220. The opening of the differential pressure regulating valve 250 is controlled with the projection 258*a* of the valve section 258 abutting against the lid section 260. The lower surface of the circular plate section 350*b* of the gas-liquid separating member 350 is adapted not to move across the sealing seat 256*b* of the case section 256.

As indicated by arrow A in FIG. 12, the evaporative fuel generated within the fuel tank 220 is introduced into the canister 222 through the openings 350*c* formed in the gas-liquid separating member 350, a clearance between the sealing member 262 of the valve section 258 and the sealing seat 256*b* of the case section 256, and the conduit 256*a*. The evaporative fuel introduced into the canister 222 is adsorbed and processed by activated carbon or the like of the canister 222.

For the total amount of each area of the opening portions formed in the hollow cylinder section 350*a* and in the circular plate portion 350*b* of the gas-liquid separating member 850, an area of the circle whose diameter ($\phi$) is 14 mm to 16 mm is maintained in accordance with an inner diameter of the opening 272 which is formed at the center of the float valve sealing seat 256*b*, or an inner diameter of the conduit 256*a* connected to the canister 222. Only if the valve section 250 can slide in a vertical direction, the smaller the clearance between the circumferential surface of the circular plate portion 350*b* and the inner wall surface 256*c* of the case section 256 is, the more effectively flow of the liquid fuel into the canister 222 is prevented.

The above-described gas-liquid separating member 350 is formed from the hollow cylinder section 350*a* and the circular plate portion 350*b*. However, as shown in FIG. 13, a hollow and cylindrical gas-liquid separating member 450 may be formed integrally with the valve section 258. Namely, the gas-liquid separating member 450 is positioned on the side of the inner wall surface 256*c* of the case section 256 and a small clearance is provided between the outer peripheral surface of the gas-liquid separating member 450 and the inner wall surface 256*c* of the case section 256 such that the gas-liquid separating member 450 can slide on the inner wall surface 256*c*.

With the differential pressure regulating valve 250 closed, even when running vibration of the vehicle or the like is transmitted to the differential pressure regulating valve 250 and the valve section 258 which is the moving portion vibrates irregularly, the horizontal movement of the gas-liquid separating member 450 provided in the valve section 258 is controlled by the outer peripheral surface of the gas-liquid separating member 450 and the inner wall surface 256*c* of the case section 256. This makes it possible to prevent misalignment of the sealing seat 256*b* of the case section 256 and the sealing member 262 in the direction in which the differential pressure regulating valve 250 is opened and closed and to stabilize sealing properties when the differential pressure regulating valve 250 is closed.

In addition, even when the running vibration of the vehicle or the like is transmitted to the differential pressure regulating valve 250 and the valve section 258 opens inadvertently against elastic force of the spring 270 and even when the liquid fuel moves within the fuel tank 220 due to a rapid turning motion of the vehicle or the like and is introduced into the high pressure section 254 of the differential pressure regulating valve 250, the gas-liquid separating member 450 moves synchronous with the movement of the valve section 258 and is interposed between the sealing member 262 and the sealing seat 256*b* to close the opening of the differential pressure regulating valve 250. For this reason, the liquid fuel is prevented from flowing into the canister 222 through the opening of the differential pressure regulating valve 250. Accordingly, the amount of activated carbon of the canister 222 used to process the liquid fuel can be decreased and the canister 222 can be made smaller.

When fueling, the evaporative fuel generated within the fuel tank 220 is introduced into the canister 222 through the openings 450*c* formed in the gas-liquid separating member 450, a clearance between the sealing member 262 of the valve section 258 and the sealing seat 256*b* of the case section 256, and the conduit 256*a*. The evaporative fuel introduced into the canister 222 is adsorbed and processed by activated carbon or the like of the canister 222.

Figure 14:
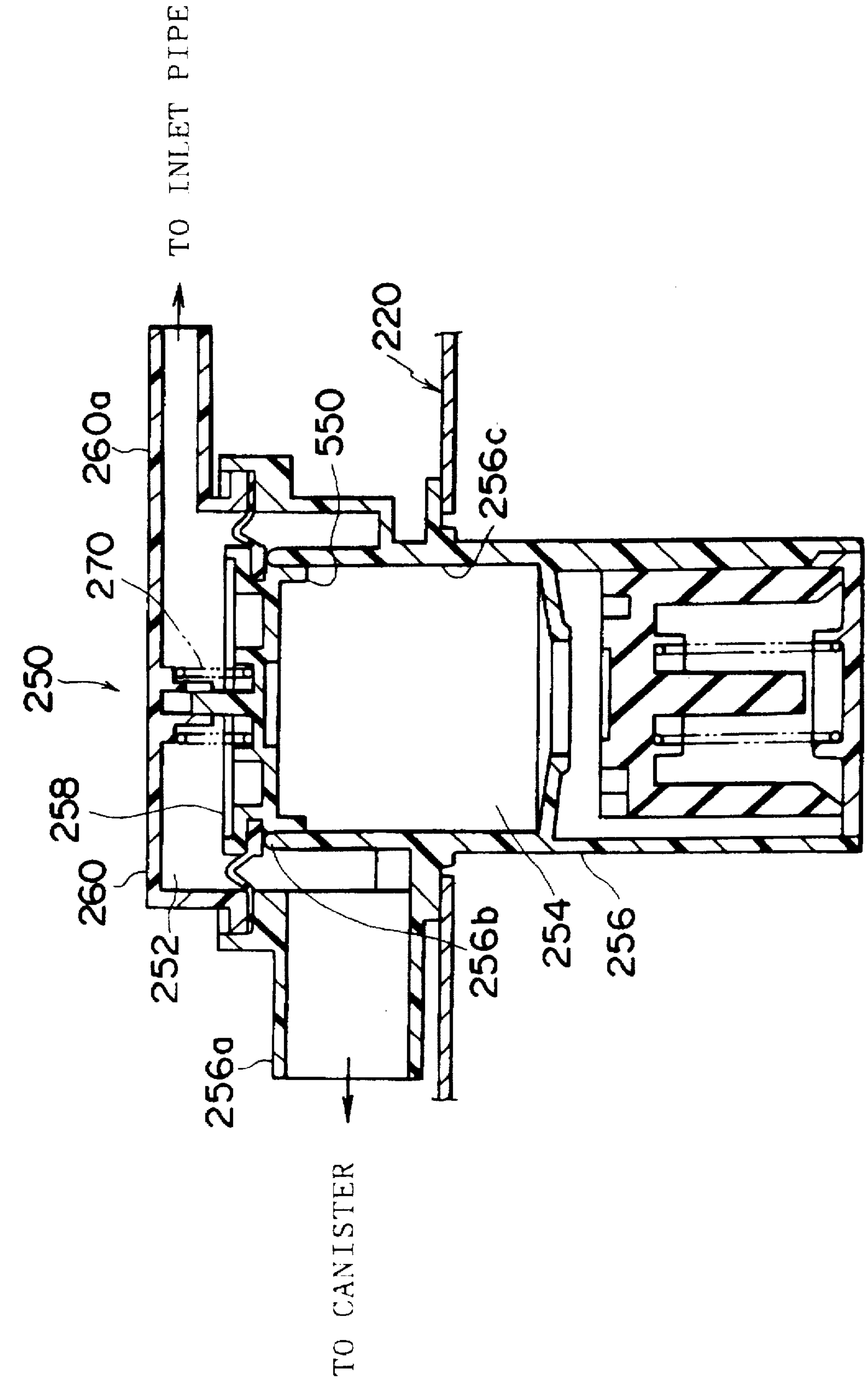
FIG. 14 is a longitudinal cross-sectional view of an evaporative-fuel emission preventing apparatus according to a sixth embodiment of the present invention, which shows a state in which an opening/closing valve is closed.
Figure 15:
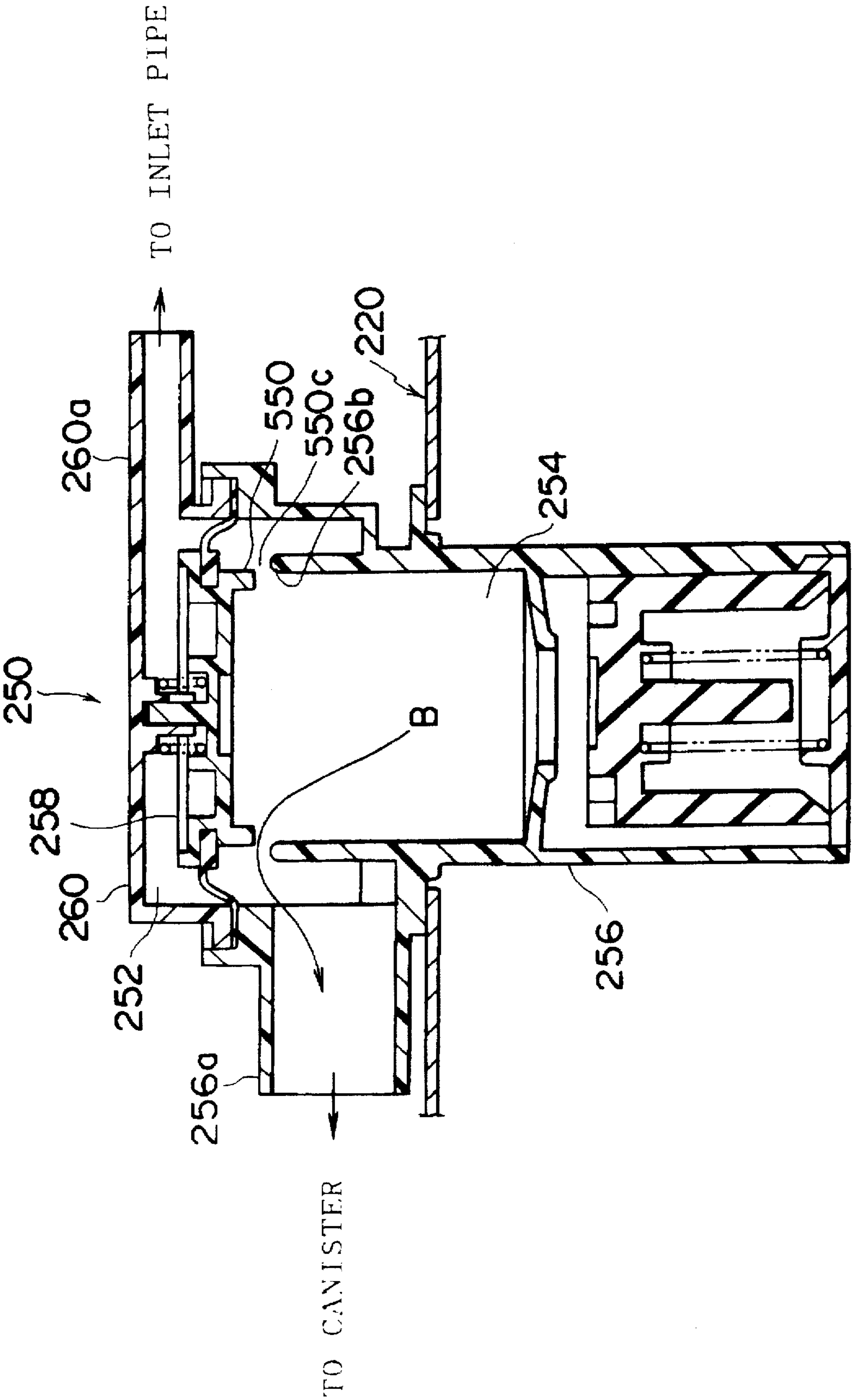
FIG. 15 is a longitudinal cross-sectional view similar to FIG. 14, which shows a state in which the opening/closing valve is open.
Figure 16:
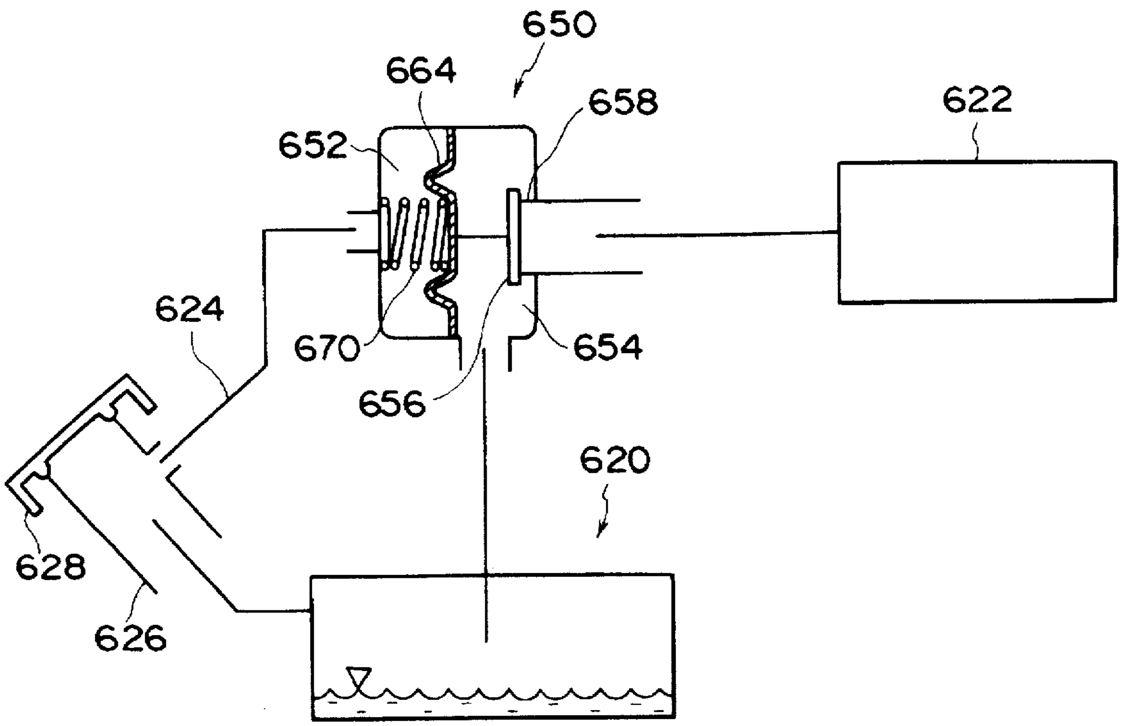
FIG. 16 is a diagram for illustrating a conventional system.

FIGS. 14 and 15 show a sixth embodiment of the present invention. FIG. 14 shows a state in which a differential pressure regulating valve which is an opening/closing valve is closed, and FIG. 15 shows a state in which the differential pressure regulating valve is open. It should be noted that the same descriptions as those of the above-described fifth embodiment will be partially omitted.

As shown in FIG. 14, a gas-liquid separating member 550 is provided integrally with the valve section 258 and is positioned on the side of the inner wall surface 256*c* of the case section 256 to slide on the inner wall surface 256*c* in the direction in which the differential pressure regulating valve 250 is opened and closed. A small clearance is provided between the outer peripheral surface of the gas-liquid separating member 550 and the inner wall surface 256*c* of the case section 256 such that the gas-liquid separating member 550 can slide on the inner wall surface 256*c*.

With the differential pressure regulating valve 250 closed, even when running vibration of a vehicle or the like is transmitted to the differential pressure regulating valve 250 and the valve section 258 which is the moving portion vibrates irregularly, a horizontal movement of the gas-liquid separating member 550 provided in the valve section 258 is controlled by the circumferential surface of the gas-liquid separating member 550 and the inner wall surface 256*c* of the case section 256. This makes it possible to prevent misalignment of the sealing seat 256*b* of the case section 256 and the sealing member 262 in the direction in which the differential pressure regulating valve 250 is opened and closed and to stabilize sealing properties when the differential pressure regulating valve 250 is closed.

Moreover, even when the running vibration of the vehicle or the like is transmitted to the differential pressure regulating valve 250 and the valve section 258 opens inadvertently against the elastic force of the spring 270 and even when the liquid fuel moves within the fuel tank 220 due to the rapid turning of the vehicle or the like and is introduced into the high pressure section 254 of the differential pressure regulating valve 250, the gas-liquid separating member 550 moves synchronous with the movement of the valve section 258 and is interposed between the sealing member 262 and the sealing seat 256*b* to close the opening of the differential pressure regulating valve 250 so long as the bottom portion of the gas-liquid separating member 550 does not move across the sealing seat 256*b*. For this reason, the liquid fuel is prevented from flowing into the canister 222 through the opening of the differential pressure regulating valve 250. Accordingly, the amount of activated carbon of the canister 222 used to process the liquid fuel can be decreased and the canister 222 can be made smaller.

In the sixth embodiment, when running vibration of the vehicle is generated, the gas-liquid separating member moves synchronous with the opening of the opening/closing valve to close the opening of the opening/closing valve. Further, when fueling, as shown in FIG. 15, the differential pressure regulating valve 250 is open substantially at the maximum. At this time, the bottom surface of the gas-liquid separating member 550 moves upward over the sealing seat 256*b* of the case section 256. The opening 550*c* of the passageway for introduction of the evaporative fuel into the canister is maintained between the bottom portion of the gas-liquid separating member 550 and the sealing seat 256*b* of the case section 256. As indicated by arrow B in FIG. 15, the evaporative fuel is introduced into the canister through the opening 550*c* and the conduit 256*a*.

Meanwhile, when a tapered portion is formed at the distal end of the bottom portion of the gas-liquid separating member 550 by considering the closing of the differential pressure regulating valve, the closing operation of the differential pressure regulating valve can be satisfactorily effected.

Meanwhile, the fifth and sixth embodiments are each constructed in that the moving portion of the differential pressure regulating valve which is the opening/closing valve is urged toward the fuel tank in the direction in which the differential regulating valve is closed. However, the present invention is not limited to the same, and the moving portion of the differential pressure regulating valve may be formed to be urged against a conduit section (for example, the conduit 258*a*) which is disposed on the side of the canister.

Moreover, only if the opening/closing valve is adapted to be closed with the moving portion being urged against the fixing portion, the present invention is not limited to the differential pressure regulating valve shown in the fifth and sixth embodiments and an electromagnetic valve or the like may be used.

The evaporative-fuel emission preventing apparatus according to the fifth and sixth embodiments is constructed in that the gas-liquid separating member moves synchronous with the movement of the opening/closing valve to close the opening of the opening/closing valve. Accordingly, it is possible to prevent the liquid fuel from flowing into the canister and to decrease the amount of activated carbon of the canister used to process the liquid fuel, thereby resulting in reduction in size of the canister.

While the embodiments of the present invention, as herein disclosed, constitute preferred forms, it is to be understood that other forms might be adopted.

What is claimed is:

1. An evaporative-fuel emission preventing apparatus comprising:

a fuel tank for a vehicle;

a canister for processing evaporative fuel generated within the fuel tank;

a passageway for connecting the fuel tank and the canister;

a differential pressure regulating valve which is provided in the course of the passageway so as to open and shut off the passageway by an opening and closing operation of the differential pressure regulating valve, a low pressure section of the differential pressure regulating valve being connected to a vicinity of a fueling port of the fuel tank and a high pressure section of the differential pressure regulating valve being connected to the fuel tank; and a communicating member provided to allow communication between the low pressure section of the differential pressure regulating valve and the fuel tank and return liquid fuel introduced into the low pressure section of the differential pressure regulating valve to the fuel tank, wherein said communicating member is a communicating hole which is formed in a moving valve section of the differential pressure regulating valve such that the low pressure section and the high pressure section of the differential pressure regulating valve communicate with each other.

2. An evaporative-fuel emission preventing apparatus according to claim 1, further comprising a passing gas quantity-limiting member which is provided to, when fueling, limit a quantity of passing gas of evaporative fuel introduced into the low pressure section of the differential pressure regulating valve through said communicating member.

3. An evaporative-fuel emission preventing apparatus according to claim 1, further comprising a passing gas quantity-limiting member which is provided to, when fueling, limit a quantity of passing gas of evaporative fuel introduced into the low pressure section of the differential pressure regulating valve through said communicating member.

4. An evaporative-fuel emission preventing apparatus according to claim 3, wherein said passing gas quantity-limiting member is a convex portion which is provided in the low pressure section of the differential pressure regulating valve in a fixed manner and a diameter of the convex portion is formed slightly smaller than an inner diameter of the communicating hole so that the convex portion is engaged with the communicating hole with the differential pressure regulating valve being open.

5. An evaporative-fuel emission preventing apparatus according to claim 4, further comprising guide pieces which is formed in the moving valve section at intervals, said guide pieces being provided such that the convex portion is engaged with the communicating hole with the differential pressure regulating valve being open.

* * * * *